(12) United States Patent
Karpas et al.

(10) Patent No.: US 11,481,826 B1
(45) Date of Patent: Oct. 25, 2022

(54) SYSTEMS AND METHODS FOR ORDERING AND FLUID TRANSFER PRINTING A CUSTOM-PRINTED ITEM

(71) Applicant: STANLEY BLACK & DECKER INC., New Britain, CT (US)

(72) Inventors: Leslie Karpas, Los Angeles, CA (US); Sky Van Iderstine, Richmond, VA (US); Morgan Platt, Atlanta, GA (US); Robert P. Welsh, Phoenix, MD (US); Jessica Searfino, Whitemarsh, MD (US); Gautam Bagal, Fort Wayne, IN (US)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

(21) Appl. No.: 17/455,182

(22) Filed: Nov. 16, 2021

(51) Int. Cl.
| | |
|---|---|
| G06Q 30/06 | (2012.01) |
| G06Q 10/08 | (2012.01) |
| B41F 16/00 | (2006.01) |
| B41F 33/00 | (2006.01) |
| G06T 1/00 | (2006.01) |
| G06F 21/10 | (2013.01) |

(52) U.S. Cl.
CPC ....... *G06Q 30/0621* (2013.01); *G06Q 10/087* (2013.01); *G06Q 30/0633* (2013.01); *B41F 16/0073* (2013.01); *B41F 33/009* (2013.01); *G06F 21/10* (2013.01); *G06T 1/0028* (2013.01)

(58) Field of Classification Search
CPC .......... G06Q 30/0621; G06Q 30/0633; G06Q 10/087
See application file for complete search history.

(56) References Cited

U.S. PATENT DOCUMENTS

| | | | |
|---|---|---|---|
| 2005/0289018 A1* | 12/2005 | Sullivan | G06Q 30/00 |
| | | | 705/26.81 |
| 2013/0059533 A1* | 3/2013 | Kwon | H04B 5/0031 |
| | | | 455/73 |

(Continued)

OTHER PUBLICATIONS

How to customize your car with hydro dipping and two-tone paint. DiNardo, A. (Sep. 3, 2021). How to customize your car with hydro dipping and two-tone paint. Business Insider. Retrieved via ProQuest. (Year: 2021).*

(Continued)

*Primary Examiner* — Michael Misiaszek
(74) *Attorney, Agent, or Firm* — Adan Ayala

(57) ABSTRACT

Provided herein are methods and systems for the custom-printing of an item including, e.g., a) accepting customer request data for a workpiece and customer request data for a graphic design to cover at least a portion of the workpiece; b) accepting workpiece identifier data from a workpiece database based on the customer request data; c) accepting print design data from a print design database based on the customer request data for a graphic design; d) associating the print design data with the workpiece identifier data; e) printing the print design data onto a hydrofilm portion; f) placing the hydrofilm portion onto a fluid surface in a dip tank; g) applying an activator to the hydrofilm portion to yield an activated hydrofilm portion; and h) dipping the workpiece into the dip tank, whereby the activated hydrofilm portion is bonded to the workpiece as a result of the dipping.

26 Claims, 37 Drawing Sheets

(56) References Cited

U.S. PATENT DOCUMENTS

| | | | | |
|---|---|---|---|---|
| 2013/0173415 | A1* | 7/2013 | Harvill | G06Q 30/06 705/26.5 |
| 2015/0066189 | A1* | 3/2015 | Mulligan | G06Q 30/0621 700/136 |
| 2016/0338483 | A1* | 11/2016 | Eccarius | A46B 15/0085 |
| 2020/0160612 | A1* | 5/2020 | Bowen | G06F 30/00 |
| 2021/0241362 | A1* | 8/2021 | Nguyen | G06Q 30/0643 |

OTHER PUBLICATIONS

Yuan Heng Tai: 3 Basic Guides to "Water Transfer Printing—Hydrographics"—Process, Equipment and Design. Yuan Heng Tai Water Transfer Printing Co., Ltd. Webpage dated Jul. 28, 2021. <https://www.prm-taiwan.com/blog/3-Basic-Guides-to-Water-Transfer-Printing-Hydrographics-Process-Equipment-and-Design_101> (Year: 2021).*

MKS Supply/Strassell's Machine Offers Hydro Dip Service. Anonymous. The Shooting Industry 66.11: 17. San Diego: Publishers Development Corporation. (Nov. 2021). Retrieved via ProQuest. (Year: 2021).*

H2-Oh! Using liquid to print. Lind, Treva. Journal of Business26. 20: A4. Northwest Business Press Inc. (Sep. 22, 2011). Retrieved via ProQuest. (Year: 2011).*

How to customize your car with hydro dipping and two-tone paint. DiNardo, Anthony. Business Insider, US edition [New York] Sep. 3, 2021. (Year: 2021).*

* cited by examiner

SYSTEMS AND METHODS FOR ORDERING AND FLUID TRANSFER PRINTING A CUSTOM-PRINTED ITEM

FIELD

The present patent application relates to fluid transfer (or hydrographic) printing methods and systems.

BACKGROUND

Fluid transfer printing is a way of transferring a design or pattern onto an object. Existing methods and systems for fluid transfer printing are labor-intensive and low throughput. The present patent application provides improvements in ordering, printing hydrofilms, and dipping of products for fluid transfer printing at scale.

SUMMARY

One aspect of the present patent application provides methods and systems for the custom-printing of an item including a) accepting a customer request for a workpiece and a customer request for a graphic design to cover at least a portion of the workpiece; b) accepting workpiece identifier data from a workpiece database based on the customer request; c) accepting print design data from a print design database based on the request for a graphic design; d) associating the print design data with the workpiece identifier data; e) printing the print design data onto a hydrofilm portion; f) placing the hydrofilm portion onto a fluid surface in a dip tank; g) applying an activator to the hydrofilm portion to yield an activated hydrofilm portion; and h) dipping the workpiece into the dip tank, whereby the activated hydrofilm portion is bonded to the workpiece as a result of the dipping.

In one aspect of the present patent application, an online store provides a means for accepting user-uploaded images for printing on a product. For example, a method including accepting a user-uploaded design file and an order for a custom-printed workpiece. In some embodiments, the order includes an order for at least one of a custom-printed power tool, a custom-printed battery, or a custom-printed power tool accessory.

Another aspect of the present patent application includes evaluating graphic design for a conflict with one or more third-party intellectual property rights. In some embodiments, this is performed by a machine vision agent programmed to recognize images and text that are known or suspected to be protected by one or more intellectual property rights.

Another method embodiment includes a) receiving a digital image file; b) manipulating at least one aspect of at least a portion of a visual element present within the digital image file; and c) printing at least a portion of a manipulated visual element onto one or more hydrofilm sheets.

Another aspect of the present patent application includes a masking fixture, wherein the masking fixture is operable to cover a designated portion of a workpiece; the masking fixture further including a holding portion operable to facilitate movement of the workpiece into and out of a fluid transfer printing dip tank.

In another embodiment, the system is designed to print multiple sets of print design data onto one or more hydrofilm sheets, wherein each set of print design data is printed on a discrete zone of the hydrofilm portion. In this way, multiple print designs can be applied to a hydrofilm sheet or sheets for high throughput hydrofilm printing and subsequent product dipping.

In yet another embodiment, a compound bracket may be employed to facilitate hydrodipping of a number of different workpieces at the same time. For example, the compound bracket may include a support structure having a plurality of attachment points, wherein each attachment point is operable to suspend a workpiece during a dipping step of a fluid transfer printing process; and wherein each attachment point is independently adjustable to a range of angles relative to a horizontal surface. In this way workpiece requiring different dipping angles may be dipped in the same batch.

In a further embodiment, the compound bracket is associated with one or more quick response (QR) codes or RFIDs associated with specific workpieces. For example, the QR codes or RFIDs may include information about a desired angle with which to suspend the specific workpieces during a hydrodipping process.

In a further method embodiment, the system may a) accept print design data corresponding to a plurality of graphic designs; b) map the print design data to a sheet of hydrofilm, wherein the plurality of graphic designs is arranged to facilitate hydrodipping of a plurality of workpieces corresponding to the plurality of graphic designs; c) print the print design data onto a hydrofilm portion; and d) hydrodip the plurality of workpieces onto the hydrofilm portion, whereby the hydrofilm portion is bonded to the plurality of workpieces, thereby transferring the plurality of graphic designs onto the plurality of workpieces.

Another embodiment includes a method of tracking an order for a custom-printed item prior to shipping, including a) placing an identifier code on an enclosure of an ordered item, wherein the identifier code includes at least one of order information, customer billing information, customer shipping information, print design information, printer setting information, or hydrodipping setting information; b) placing a corresponding identifier code on at least one hydrofilm portion, wherein the corresponding identifier code includes at least information about the ordered item; c) performing fluid transfer printing of the at least one hydrofilm portion onto the ordered item; and d) scanning the identifier code and the corresponding identifier code to confirm a match prior to shipping.

These and other aspects of the present patent application, as well as the methods of operation and functions of the related elements of structure and the combination of parts and economies of printing and manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a," "an," and "the" include plural referents unless the context clearly dictates otherwise.

DETAILED DESCRIPTION

End-to-End System

Figure 1:
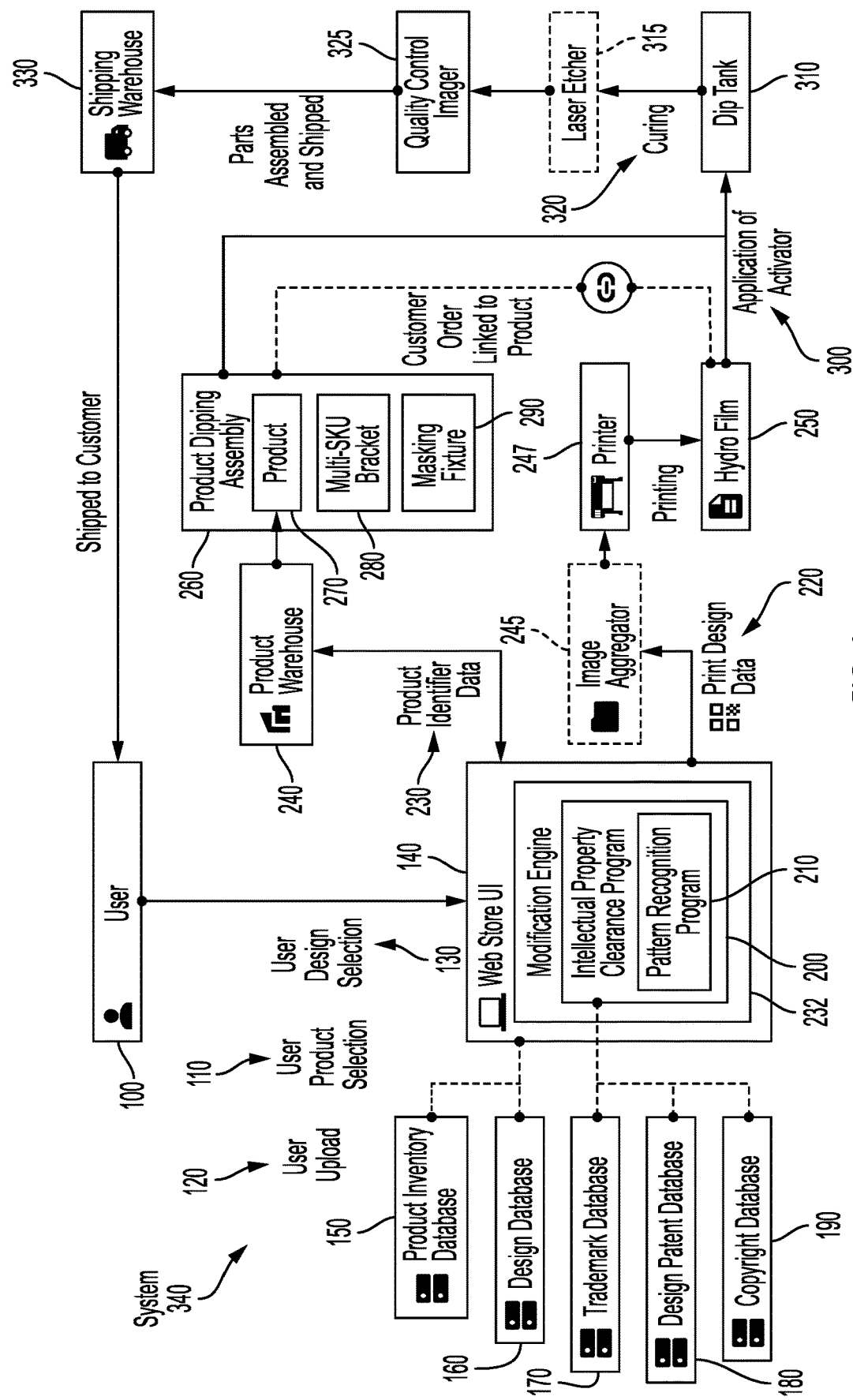
FIG. 1 shows a system environment according to the present inventions.

Referring now more particularly to the drawings, FIG. 1 shows a system architecture of system 340 according to an embodiment of the present patent application. User 100 is able to provide a user upload 110, including, for example, an original design, a licensed design, or other design for printing on a workpiece. Alternatively, user 100 may choose a user design selection 130 from web store UI 140, for example, a searchable database of available designs from design database 160.

User 100 may also choose a product upon which to print their chosen design, for example user product selection 120 from searchable product inventory database 150 via web store UI 140. Products may include power tools, accessories, storage items, or other items for sale on web store UI 140. User product selection 120 may serve as the workpiece that will receive the user upload 110 or the user design selection 130 through a fluid transfer printing process, resulting in a custom printed workpiece or product.

Once a design selection is made, user upload 110 or user design selection 130 may be reviewed for conflict with any known intellectual property, such as trademarks, design patents, or copyrights. Intellectual property clearance program 200 may compare patterns, text, or images in print design 220 with known patterns, Non-Fungible Tokens (NFTs), text, and images stored in, for example, trademark database 170, design patent database 180, copyright database 190, or the like. Artificial intelligence or machine vision based programs may perform pattern recognition on images, text, patterns, or other graphic data to identify any matches with entities within trademark database 170, design patent database 180, or copyright database 190. One example of such a visual search tool is marketed by Clarifai, which offers a "product similarity search" to "make it easier for customers to find products they want by searching by image or photo instead of keywords. With visual search and computer vision connect customers with similar products to increase their likelihood to purchase and increase cross-selling." http://www.clarifai.com/use-cases/visual-search. The present patent application repurposes this kind of image-based search tool in a novel way to perform intellectual property clearance and print quality control via, for example, pattern recognition program 210.

Intellectual property clearance program 200 may validate images in a number of ways. For example, in some embodiments intellectual property clearance program 200 may compare text or images from a licensing agreement with requested text or images for compliance with the image owner's requirements for use of a trademarked image. For example, a licensing agreement may prohibit changes to an original image's color scheme or placement in combination with other images (e.g., a children's animated character may not be juxtaposed with an alcoholic beverage). Accordingly, pattern recognition program 210 may be trained on a set of color schemes against which to compare requested content to indicate acceptable or unacceptable patterns, text, or images.

In yet additional embodiments, intellectual property clearance program 200 or pattern recognition program 210 may evaluate graphic design data for objectionable content, such as obscenity, hate speech, nudity, libel, or other offensive content, or e.g., content that violates a standard or terms of use. In yet other embodiments, intellectual property clearance program 200 or pattern recognition program 210 may search requested images or text for placement on the workpiece for content restrictions such as illegal content, profanity, or regionally-specific image prohibitions such as hate group symbols that are specific to a region, or national flag images. Content restrictions may be formally defined, e.g., by statute, administrative rules or policies, or generated informally, e.g., by custom.

In yet another embodiment, intellectual property clearance program 200 or pattern recognition program 210 may evaluate selected images or text for conformance with brand likeness or style guides or guidelines, such as the degree to which a sports team logo may be stretched or otherwise deformed across an irregular surface. In this way the instant methods and systems my preserve the integrity of trademarks, logos, brand identifiers, trade dress, or the like. As another example, intellectual property clearance program 200 or pattern recognition program 210 may evaluate whether a requested image has been discontinued, such as when a company replaces an old logo for a new one and disallows usage of the discontinued logo.

In yet other embodiments, intellectual property clearance program 200 or pattern recognition program 210 may identify any competitor product images or brand logos in an uploaded image, which could be flagged for disqualification.

Print design data 220 that passes intellectual property clearance program 200 may proceed to printer 240 for printing, while print design data 220 that does not pass intellectual property clearance program 200 due to possible infringement of a third-party intellectual property right or other reason may be rejected, or passed to a human facilitator for a determination of non-infringement, fair use, potential licensing avenues, or other course of action known to those of ordinary skill in the art.

In parallel to the processing of print design data 220 described above, product identifier data 230 corresponding to user product selection 120 may be sent to product warehouse 240 for retrieval of product 270 once inventory of product 270 is confirmed with an inventory management system. Product 270 is then prepared for fluid transfer printing, including optional attachment to multi-SKU bracket 280 or masking fixture 290. Masking fixture 290 may at least function to 1) serve as the point of attachment to hold product 270 during the dipping process; and 2) mask one or more portions of product 270 that are not intended to be printed on, such a grip, a vent, a charging contact, or a port.

Print design data 220 passing optional intellectual property clearance program 200 may be sent to printer 240, which may include an inkjet printer such as a Mimaki® brand inkjet printer or any printer capable of printing on hydrofilm. Print design data 220 is then processed by printer 240 to print user upload 110 or user design selection 130 onto hydrofilm 250. Activator 300 is then applied to hydrofilm 250, which is placed on the surface of fluid in dip tank 310 in advance of product dipping.

Product dipping assembly 260 including at least product 270 is then lowered onto activated hydrofilm 250, whereby, in some embodiments, pigment from hydrofilm 250 is transferred onto product 270 to create a custom-printed product 270. After a period of curing 320 and optional quality assurance checks, product 270 may be sent to shipping warehouse 330 for packaging and shipping to user 100 to complete the process.

Accordingly, one embodiment of the present patent application relates to methods and systems for accepting a customer request for a workpiece or product, and accepting a customer request for a graphic design to cover at least a portion of the workpiece, for example via web store UI 140. The system may further accept workpiece identifier data from a workpiece database based on the customer request, and accept print design data from a print design database based on the request for a graphic design. The system may then associate the print design data with the workpiece identifier data so that there is a link between the two sets of data throughout the printing process, and so that the correct order is fulfilled for the customer. A printer 240 may then print the print design data onto a hydrofilm portion, and the hydrofilm portion may be placed onto a fluid surface in a dip tank. In some embodiments, a hydrofilm sheet may be fed directly onto the surface of fluid in a dip tank from printer 240 so as to expedite printing and dipping. An activator is applied to the hydrofilm portion prior to dipping to yield an activated hydrofilm portion that is ready for dipping and, e.g., pigment transfer to a workpiece. The workpiece is then lowered onto the hydrofilm portion (i.e., dipped into the dip tank), whereby the activated hydrofilm portion is bonded to the workpiece as a result of the dipping.

In some embodiments, a machine vision system may be employed to aid in alignment of the workpiece with the hydrofilm for more accurate placement of a graphic on the workpiece. Such a machine vision system may be coordinated with a robotic dipping support such as multi-workpiece bracket 1100 to 1) make fine adjustments to precisely line up the workpiece with the printed hydrofilm; 2) make fine adjustments to the articulation angle 4000; or 3) make fine adjustments to the rate of lowering of the workpiece onto the hydrofilm.

In some embodiments, after dipping is completed, and either before or after a curing process (e.g., curing 320), a workpiece covered by a hydrographic may be scanned by quality control imager 325 for confirmation that a printed workpiece meets image quality standards, such as resolution, color quality, or text readability. Quality control imager 325 may also be programmed to detect dipping defects such as wrinkles, tears in the hydrofilm, or defects arising from incorrect dipping rates, which may be visible on a printed workpiece as anomalous lines, distortion of images, bubbles, or areas without pigment or backing pigment only. In some embodiments, quality control imager 325 may employ artificial intelligence or machine vision tools in order to determine whether a given printed item meets a certain image standard. See, e.g., System and Method for Using Images for Automatic Visual Inspection with Machine Learning, United States Patent Application 20200005422.

The dipping process can be affected by ambient conditions in the dip tank environment such as waves in the fluid medium caused by wind or vibration, for example caused by application of activator to the hydrofilm. These movements can adversely affect the transfer of the film to the workpiece. It is therefore desirable to mitigate movement of the fluid prior to and during dipping. In some embodiments, therefore, steps may be taken to increase the viscosity of the fluid in order to reduce movement of the fluid. Alternatively, a guide or barrier may be placed around the edges of the hydrofilm as it sits on the surface of the fluid, to isolate the hydrofilm from fluid movement outside the guide or barrier.

In yet other embodiments, after dipping is complete an artificial intelligence or machine vision robotic system could be used to identify leftover hydrofilm fragments on the surface of the fluid and efficiently remove them via targeted mechanical robotic skimming. This would make the fluid transfer printing process more efficient in terms of consuming less fluid for the dip tank and in terms of generating less waste fluid or chemicals. In some embodiments, the robotic skimming is coordinated with an automated robotic dipping mechanism. For example, machine vision imaging of the dipping area may identify locations of excess hydrofilm in the dip tank after removal of the workpiece from the fluid, and then send a signal to a robotic skimmer with information about where and when to act to remove excess hydrofilm to effect removal as soon after dipping as possible.

Further, for workpieces that have regions that must not be covered by film or pigment, such as vents or other openings, a laser may be employed to cut such openings in the hydrofilm either before or after hydrodipping. In some embodiments, a masking fixture configured to mask an opening portion of a workpiece may be employed in combination with a laser treatment before or after dipping to ensure that there is a clean opening on the finished product.

Online Ordering Platform

Figure 2:
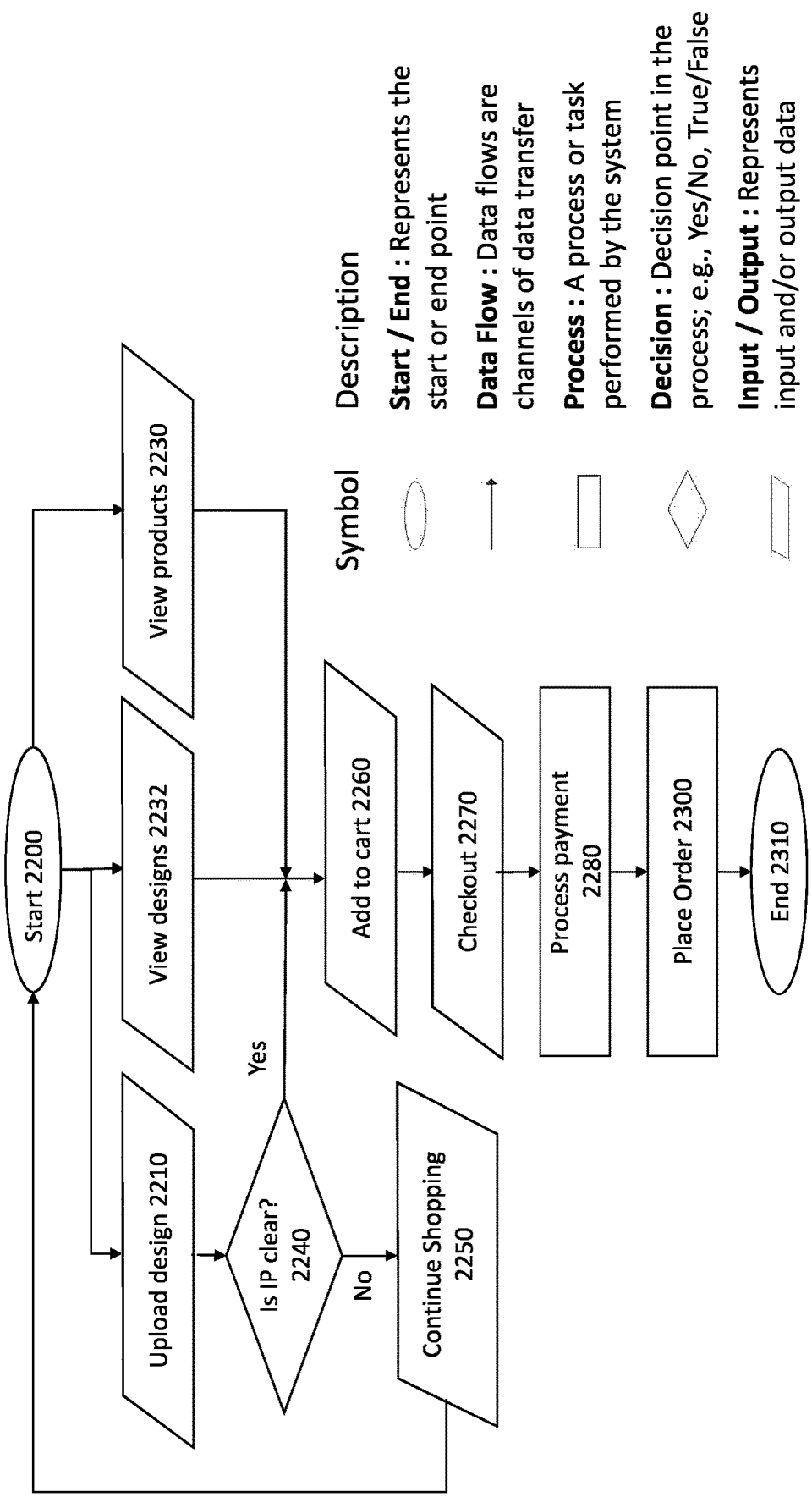
FIG. 2 shows an online ordering system for custom hydrofilm printing according to the present inventions.

With reference now to FIG. 2, an online ordering platform or web store according to the instant patent application may include operations and data flows that facilitate shopping, order receipt, optional automated intellectual property (hereinafter "IP") clearance of print designs, and payment processing.

Following start 2200, a user may upload design 2210, view designs 2220, and view products 2230 in course of an online shopping experience. Images of designs and products may be shown, and overlays of images with products may be rendered to show virtually what a custom printed product may look like after actual printing. Various product views may be presented, including 360 degree rotatable views.

Print designs, whether uploaded by a user or selected from the web store may be further modifiable by color, pattern density, tone, brightness, bit depth, resolution, or other image modification method known to those of ordinary skill in the art, for example by modification engine 232, including, e.g., a computer-aided drafting program or other design software.

For user uploaded designs, an optional IP clearance step may be employed to ask whether the IP is free from known encumbrances. For example, at Is IP clear? 2240 the system may perform an image search against known trademarked, design patented, copyrighted, or otherwise protected images, patterns, or text. In some embodiments, this may be carried out automatically via machine vision and/or artificial intelligence programs that have been trained with datasets including large volumes of known trademarked, design patented, copyrighted, or otherwise protected images, patterns, or text. Matches with known IP may be referred to a human for further analysis of non-infringement, fair use, existing licenses, licensing possibilities, or other avenues for clearing the IP for use in printing on a product. If the IP is not clear, the user may be notified and returned to the shopping pages of the web store. If the IP is clear, the print design may be added to a digital shopping cart at Add to cart 2260, together with a selected product or products after view products 2230. A user may proceed to purchase the product and design at Checkout 2270, at which time the system may Process payment 2280 and Place Order 2300. The process may conclude for the user at End 2310.

Accordingly, accepting a customer request may include accepting at least one order for a custom-printed workpiece, wherein the order includes an order for at least one of a custom-printed power tool, a custom-printed battery, or a custom-printed power tool accessory. In some embodiments, web store UI 140 of FIG. 1 may accept 1) a customer selection of a workpiece from an online store; and 2) a digital image file provided by a customer for printing on a selected workpiece. Alternatively, the customer request for a workpiece may include a selection of a product from a webstore. As shown in FIGS. 1 and 2, the webstore may include or have access to an online store including one or more databases or a digital shopping cart order tracking system.

In some embodiments a product selection may include a hand tool, a power tool, a power tool accessory, a power tool part, a vehicle part, a non-power tool, a garden tool, an item of apparel, a tape measure, or a toolbox, any one of which may be paired with a desired graphic design for custom fluid transfer printing.

Examples of power tools include a power drill, a power driver, a reciprocating saw, a flashlight, a miter saw, or a nail gun. Examples of non-power tools include a wrench, a hammer, a pliers, a screwdriver, a multi-tool, or a level.

In another embodiment, a customer may select via web store UI 140 one or more workpieces and one or more graphic designs viewable via web store UI from design database 160. Alternatively, a customer request for a graphic design may include a request for a user-uploaded graphic design to be used to cover at least a portion of a selected workpiece or product. Examples of a user-uploaded graphic design may include a user-uploaded photo, user-uploaded artwork, or user-uploaded text. In other embodiments a desired graphic design may be associated with or comprise a non-fungible token (NFT), which may be registered on a blockchain as a unique non-fungible token. The creation or registration of an NFT may occur before or after fluid transfer printing, or before or after curing, such that the integrity of the NFT is maintained through the curing step after fluid transfer printing.

In some embodiments, the system may evaluate an uploaded graphic design for a conflict with one or more third-party intellectual property rights. Such an evaluation may be performed with the assistance of a machine vision or artificial intelligence-based service programmed to evaluate an image, a portion of an image, or text for visual similarity to a trademarked image or phrase. For example, pattern recognition program 210 may use machine vision to evaluate an uploaded image or text for visual similarity to a trademarked image or phrase, or to a copyrighted phrase via an optical character recognition program.

In some embodiments, the one or more third-party intellectual property rights may include a licensing requirement, a trademark, a service mark, an instance of trade dress, a trade name, a design patent, or a copyright. Examples of a trademark include a wordmark, a brandmark, a lettermark, a logo, an icon, or a slogan.

With respect to the back-end system for tracking the customer's order from beginning to end, the operation of accepting workpiece identifier data from a workpiece database based on the customer request may include accepting a stock-keeping unit (SKU) identifier, a model number, or a serial number as the workpiece identifier data. Identifiers may be associated with a product or workpiece via code, such as RFID tag, QR code, bar code, metadata entry. For example, print design data may be associated with workpiece identifier data in a print design data file such as print design data 220.

As a means of ensuring quality of the final printed product, quality assurance steps may be taken at various points in the process of order acceptance, printing, curing, and packaging. For example, pattern recognition program 210 or modification engine 232 may perform the additional function of evaluating print design data for at least one of a minimum resolution, a minimum quality threshold, accuracy, look and feel, or legibility. In some embodiments, modification engine 232 may increase image attributes such as sharpness, contrast, color intensity, or bit depth to increase image quality in order to maintain, for example, trademark quality standards.

Pattern or Design Modification

In some embodiments, modification engine 232 may manipulate a visual element of a design for fluid transfer printing, including 1) receiving a digital image file, e.g., print design data 220; 2) manipulating at least one aspect of at least a portion of a visual element present within the digital image file; and transmitting for printing at least a portion of a manipulated visual element onto one or more hydrofilm sheets.

In some embodiments, modification engine or printer 240 may coordinate placement of a manipulated visual element on one or more hydrofilm sheets with a zone on the one or more hydrofilm sheets, whereby the manipulated visual element is positioned to adhere to a workpiece lowered onto the zone during a fluid transfer printing process.

In some embodiments, a digital image file such as print design data 220 includes one or more of a personal photograph, a design element, or a text image. Examples of aspects that may be modified include pattern, scale, angle, resolution, sharpness, contrast, positioning, brightness, tone, or color.

Examples of patterns that may be used for printing on workpieces include grasshopper strips, fractals, nano patterns, or camouflage.

To carry out modifications, modification engine 232 may employ any of a number of different tools known in the art, such as, e.g., a digital pattern generator, an accelerating curve function, a generative algorithm, or a generative adversarial network. Examples of the kinds of modifications that may be made include randomization, non-linear tessellation, periodic tessellation, or non-periodic tessellation.

In yet other embodiments, modification engine 232 may accept one or more sets of print design data that correspond to contours of the workpiece at least partly based on at least one of a light intensity matrix or a color intensity matrix. Further, modification engine 232 may apply a scale factor to the print design data to obtain scaled print design data, and then map the scaled print design data to a sheet of hydrofilm, wherein a plurality of graphic designs is arranged to facilitate hydrodipping of a plurality of workpieces corresponding to the plurality of graphic designs.

In some embodiments, a set of position coordinates may be assigned to print design data 220, and a counterpart set of position coordinates may be assigned to a sheet of hydrofilm, wherein the plurality of graphic designs is arranged to facilitate hydrodipping of a plurality of workpieces corresponding to the plurality of graphic designs. Further, modification engine 232 may use one or more matrix transformations to rotate, translate, or scale points in two-dimensional or three-dimensional space in order to model the final bonding of the print design to the hydrofilm.

Certain adjustments to image quality and appearance may be made by printer 240. In some embodiments, printing the print design data onto a hydrofilm portion may include using an inkjet printer to print the print design data onto a hydrofilm portion. For example, a Mimaki® printer or a similar printer may be used to print the print design data onto a hydrofilm portion. Additionally, printer 240 may be configured to print multiple graphic designs onto a single sheet of hydrofilm. Further, printer 240 may print multiple sets of print design data onto a hydrofilm portion, wherein each set of print design data corresponds to a customer's desired graphic design and is printed on a discrete zone of the hydrofilm portion or sheet.

With respect to the step of applying an activator to a hydrofilm portion to yield an activated hydrofilm portion, this may include applying a variable amount of activator depending on the specific needs of a particular hydrofilm portion. For example, a quantity of activator may be applied that is specific to the amount of pigment on the hydrofilm portion, or activator may be applied for a period of time that is optimal for a particular hydrofilm portion. In this example, an activator quantity or duration of exposure to the hydrofilm portion may be determined by an analysis of pigment quantity on the hydrofilm portion, for example using a machine vision program or generally through analysis of the amount or wavelengths of light absorbed. Densitometry, colorimetry, or other known methods of analyzing pigment may be used.

The activator of the present inventions may include ultraviolet light activator, aerosolized activator, or liquid activator. More specifically, activator may include one or more of xylene, isobutanol, butyl, methyl acetate, methyl ethyl ketone, ethyl isobutyl ketone, isophorone, texanol, 2-butoxyethanol, or cyclohexanone.

Multi-Functional Masking Fixture

In some embodiments, a product selected for printing may be fitted with a multi-functional masking fixture that may 1)

serve as a point of attachment for the product with a support during the fluid transfer printing process; 2) protect one or more portions of the workpiece from being printed on; or 3) contribute to a print design via a stencil function.

Figure 3:
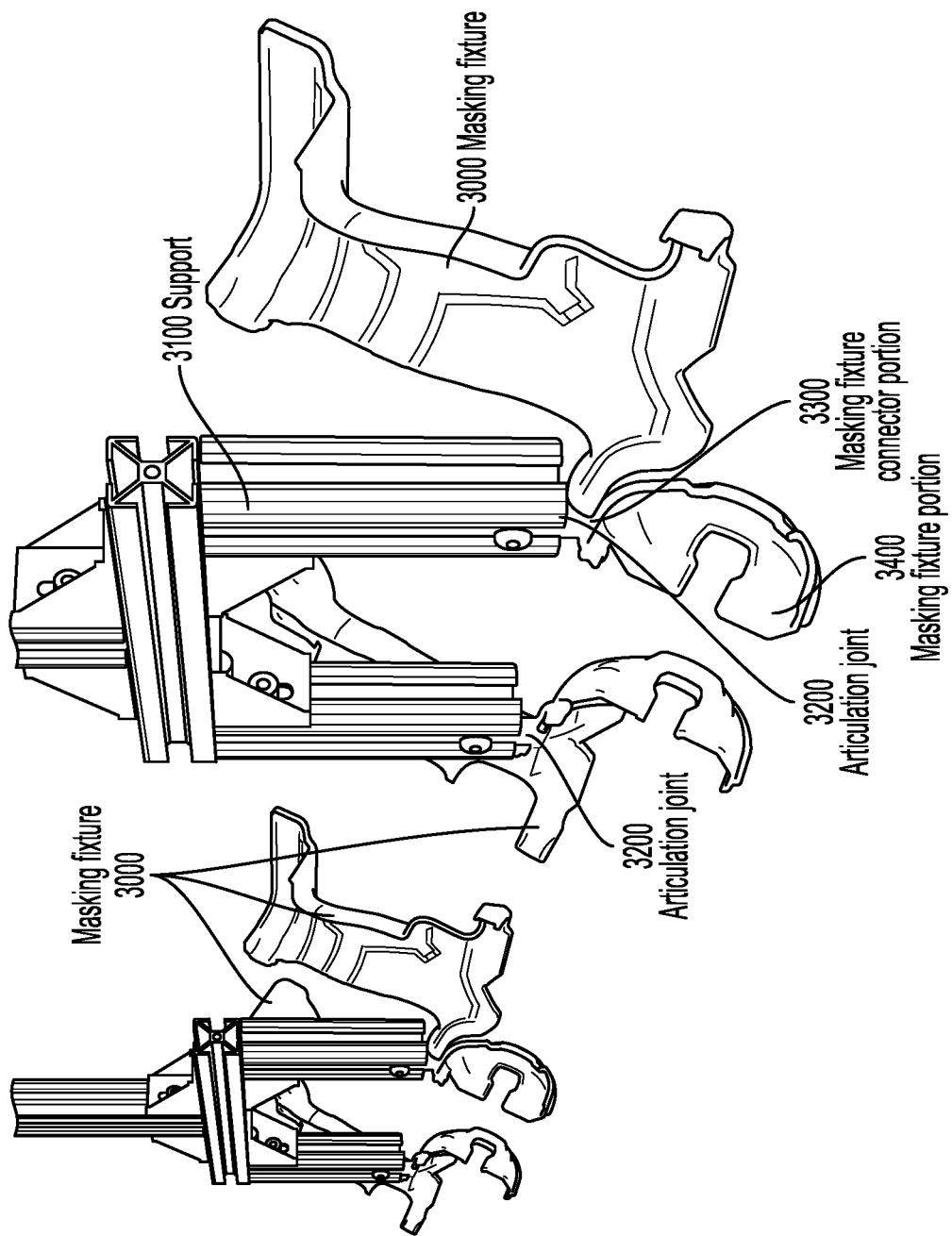
FIG. 3 shows examples of a masking fixture according to the present inventions.

With reference now to FIG. 3, masking fixture 3000 is depicted in an embodiment that is designed to fit the handle of a power tool, for example, a power driver or a power drill. Masking fixture 3000 is conformed to one half of the power tool handle, and two of masking fixture 3000 are shown attached to support 3100 via articulation joint 3200.

By having masking fixture portion 3400 connected to masking fixture 3000 by masking fixture connector portion 3300, the two independent regions that will be masked are dipped in such a way that both masking fixture portion 3400 and masking fixture 3000 will be submerged before the fluid reaches masking fixture connector portion 3300, which bridges the two together. This is how two independent regions of a workpiece may be covered without cutting a hole in the hydrofilm. In some embodiments, the bridge or connector portion will be approximately at the center of mass of the workpiece and masking fixture pair, whereas in other embodiments the connector portion may be offset to facilitate the proper hydrofilm coverage during dipping.

In some embodiments, the workpiece and masking fixture pair may be pivoted or adjusted via articulation joint 3200 during dipping to facilitate proper hydrofilm coverage during dipping, for example when the geometry is very curved, ovoid, or spherical. This kind of movement to maintain the orientation of the workpiece masking fixture pair to maintain a specific orientation relative to normal during dipping is important in some cases to avoid stretching the hydrofilm and deforming the image printed thereon.

Figure 4:
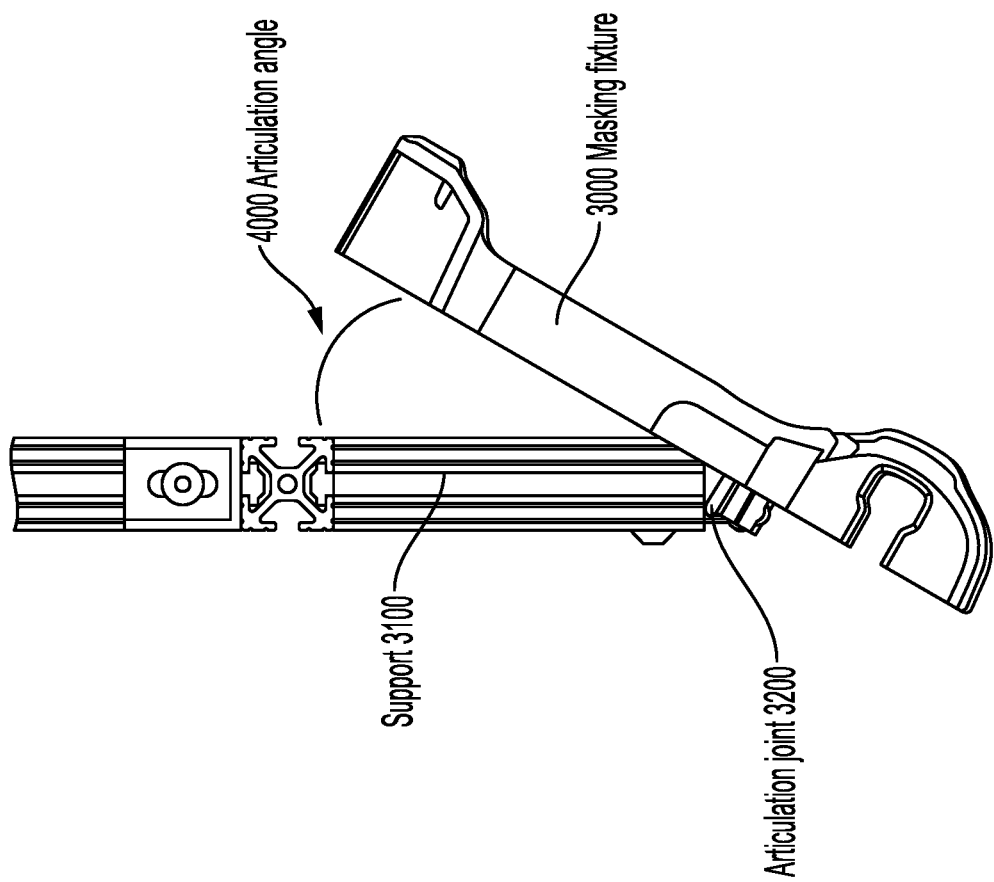
FIG. 4 shows a side view of a masking fixture according to the present inventions.

FIG. 4 presents a side view of support 3100, masking fixture 3000, and articulation joint 3200. Also shown is articulation angle 4000, which may depict the orientation of the masking fixture relative to a vertical or horizontal axis (articulation angle 4000 is depicted relative to a vertical or normal axis, approximately 35 degrees off vertical). Articulation angle 4000 will depend on the convexity or concavity of the workpiece and the optimal angle of entering the fluid from a hydrographic dipping perspective.

When dipped at an angle, a workpiece may have one side that contacts the hydrofilm, and one that does not, at least not initially. The masking fixture may thus perform a protective function, protecting surfaces that should not be exposed to activator, film, fluid, or curing, such as urethane in grip surfaces, other deformable surfaces on a workpiece, or surfaces that may otherwise be adversely affected by the hydrofilm dipping process.

Figure 5:
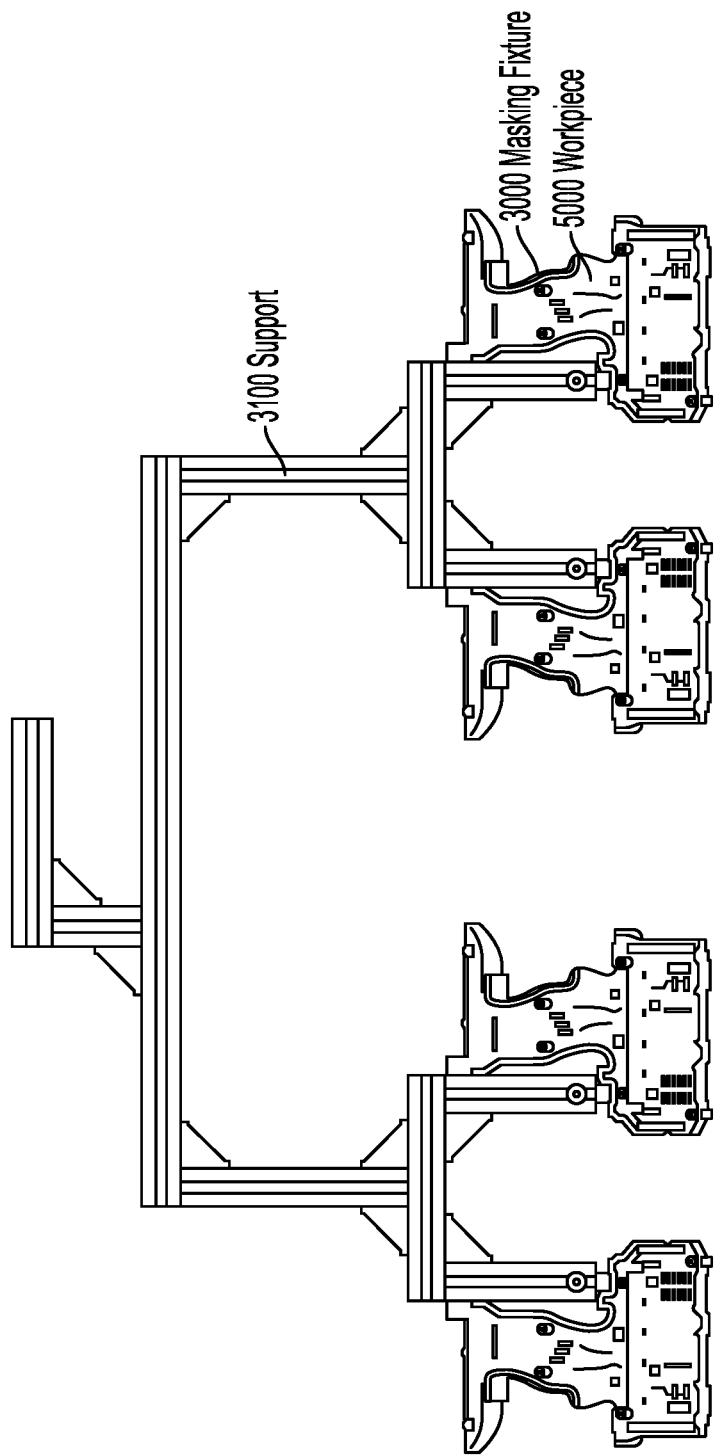
FIG. 5 shows an alternative embodiment of a set of masking fixtures with workpiece in place according to the present inventions.

FIG. 5 depicts an alternate view of a set of masking fixtures in which four of masking fixture 3000 are arranged in a different position and at a different angle relative to support 3100 than in FIG. 3. Further, FIG. 5 depicts four of workpiece 5000 held in place by the masking fixtures on support 3100. The workpieces may be spaced apart in such a way that little film is wasted, yet the dipping of one workpiece does not deform the film intended for an adjacent workpiece. In some instances, the film between two adjacent workpieces may be perforated or cut to facilitate separation of the respective portions of film for the two adjacent workpieces. In this way, when dipping is performed, the film will not be deformed as much, minimizing distortion of any design on the hydrofilm.

Articulation joint 3200 may include one or more attachment or detachment mechanisms for securing masking fixture 3000 in place during a fluid transfer printing process. In some embodiments, masking fixture 3000 is conformed to a workpiece, for example, one half of a power tool grip piece. Masking fixture 3000 may thus be reversibly attached to the workpiece for the dipping process, and detached after dipping and/or curing is complete. Mechanisms for attachment may include slip-fit, magnetic attachment points, tab locks, or other mechanism known by those of ordinary skill in the art. By way of articulation joint 3200, masking fixture 3000 may be positioned at any desired angle relative to support 3100 such that a proper position is achieved for the workpiece to contact the hydrofilm when lowered onto hydrofilm in a dipping tank.

Figure 6:
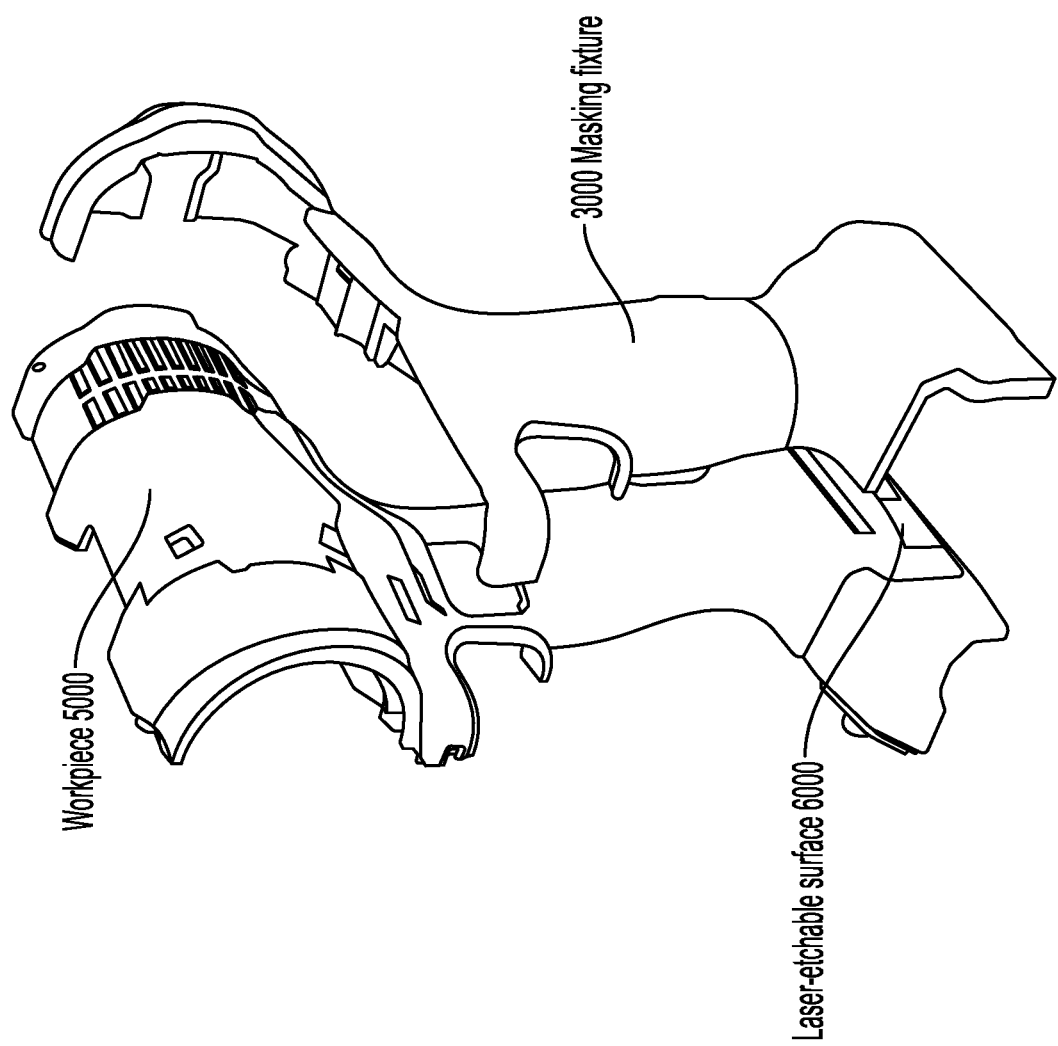
FIG. 6 shows an exploded view of a workpiece aligned with a masking fixture according to the present inventions.
Figure 7:
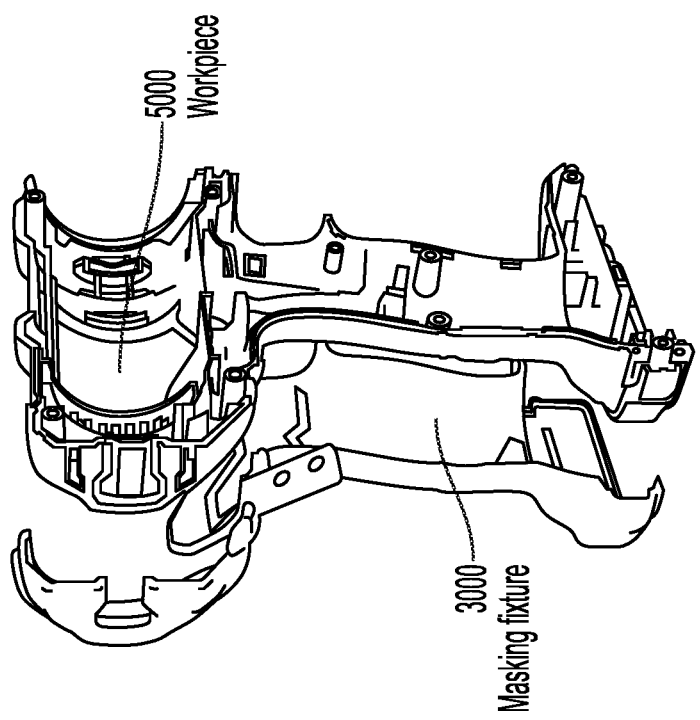
FIG. 7 shows an alternate exploded view of a workpiece aligned with a masking fixture according to the present inventions.

FIGS. 6 and 7 depict alternative exploded views of workpiece 5000 aligned with masking fixture 3000. In some embodiments, another function of masking is to enable a secondary process post-dipping, such as laser etching. For example, a portion of a workpiece may be masked such that a laser-etchable surface 6000 is created that is not covered by hydrofilm after dipping, with the intention that that area will be laser-etched with text that will be more visible than if the laser etching were done on an area covered by hydrofilm.

Figure 46:
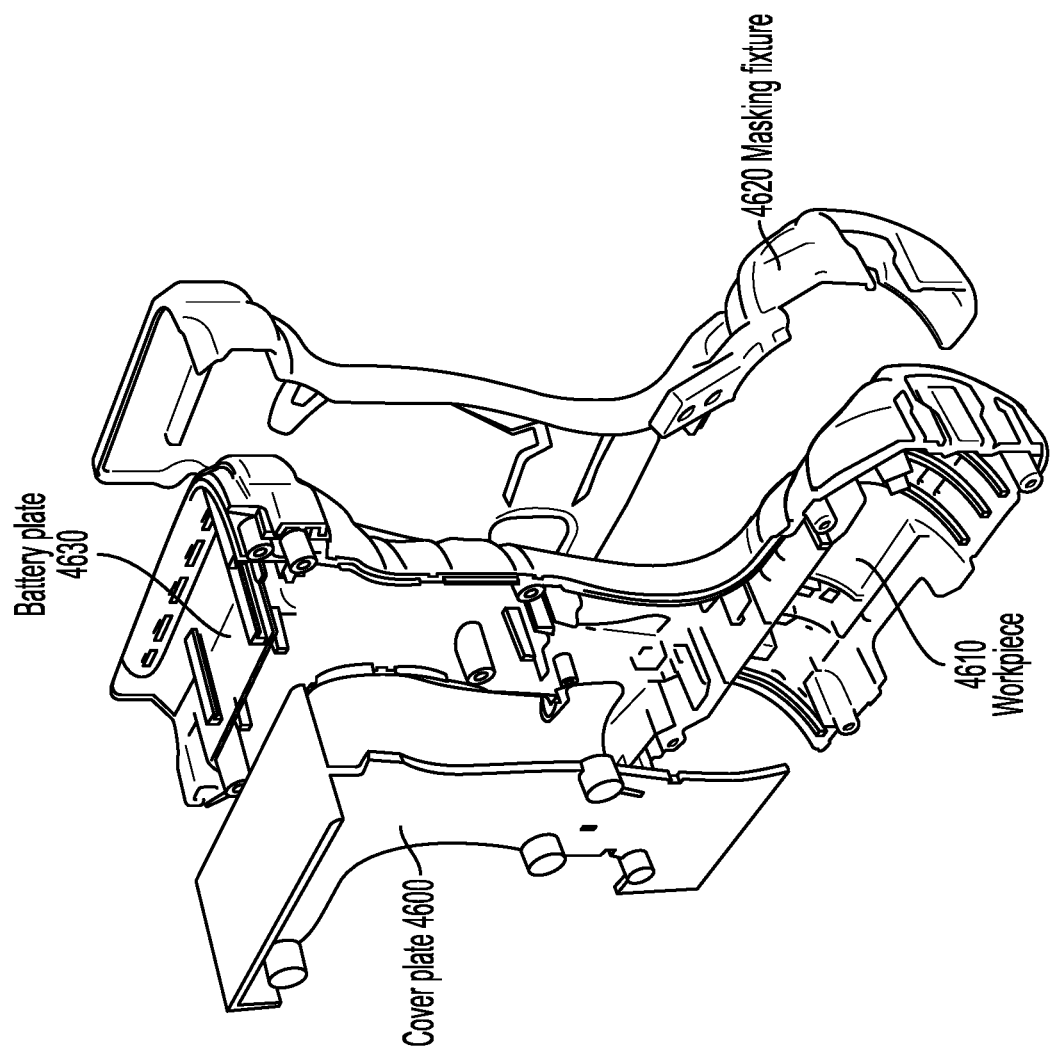
FIGS. 46 and 47 show exploded and unexploded views, respectively, of a drill housing, masking fixture, and cover plate according to certain embodiments of the present inventions.
Figure 48:
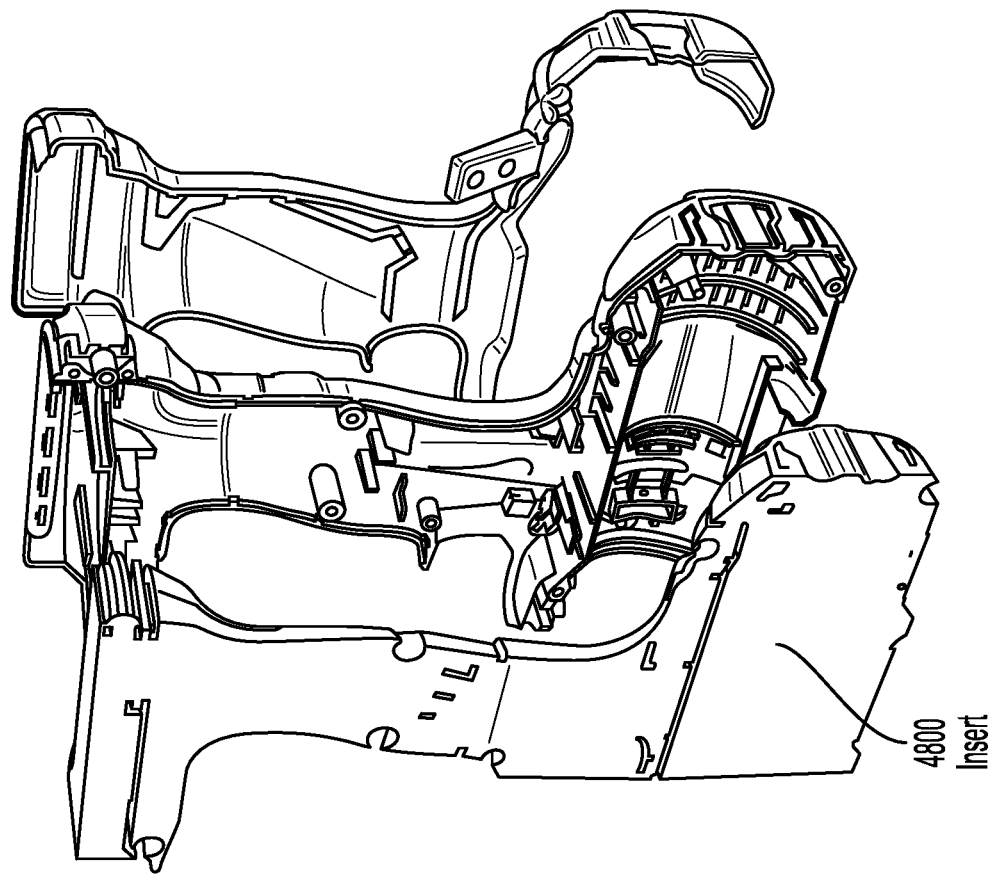
FIG. 48 is an exploded view of a protective insert, a workpiece, and a masking fixture.
Figure 47:
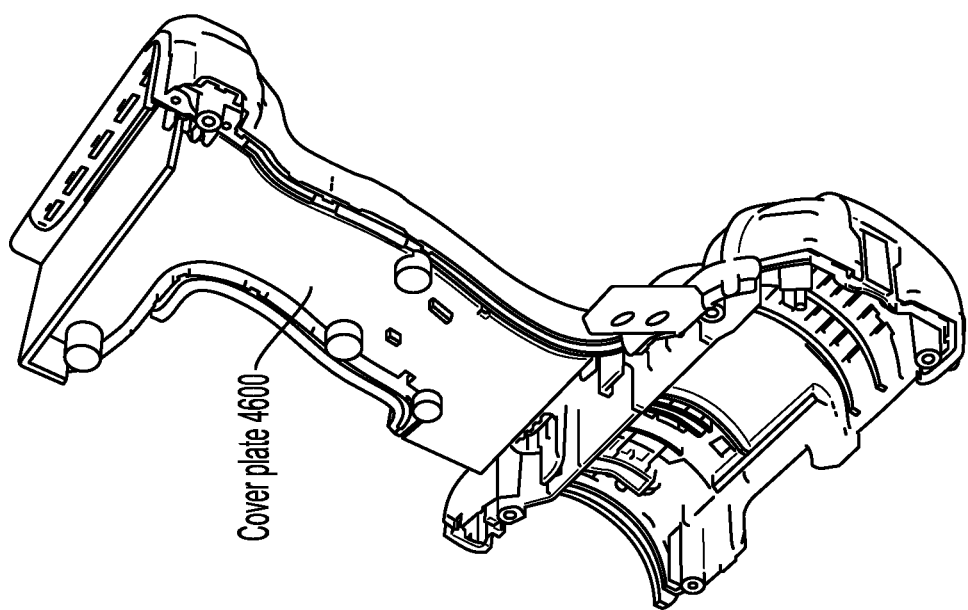

Similarly, a portion of a masking fixture may protect an RFID tag or battery contact plate on the workpiece, perhaps via a flange, flap, or other covering portion that creates a block or barrier to hydrofilm or fluid from entering an interior portion of a workpiece during dipping, similar to masking fixture portion 3400. Such an example is depicted in FIGS. 46 and 47, which show a cover plate 4600 that may be affixed to the workpiece 4610 as a cover to protect an internal portion of the workpiece 4610 such as battery plate 4630 from the dipping process. While cover plate 4600 is shown as an independent piece from masking fixture 4620, in some embodiments these two parts may be made as a single, integrated unit. This integration may include a hinge to allow movement of cover plate 4600 relative to masking fixture 4620, thereby facilitating fitting to, and removal from, workpiece 4610. FIG. 48 shows an alternative design, in which an insert 4800 serves to protect the interior of the workpiece. Such an insert may be made of plastic, foam, or other suitable material for the fluid transfer process.

Figure 8:
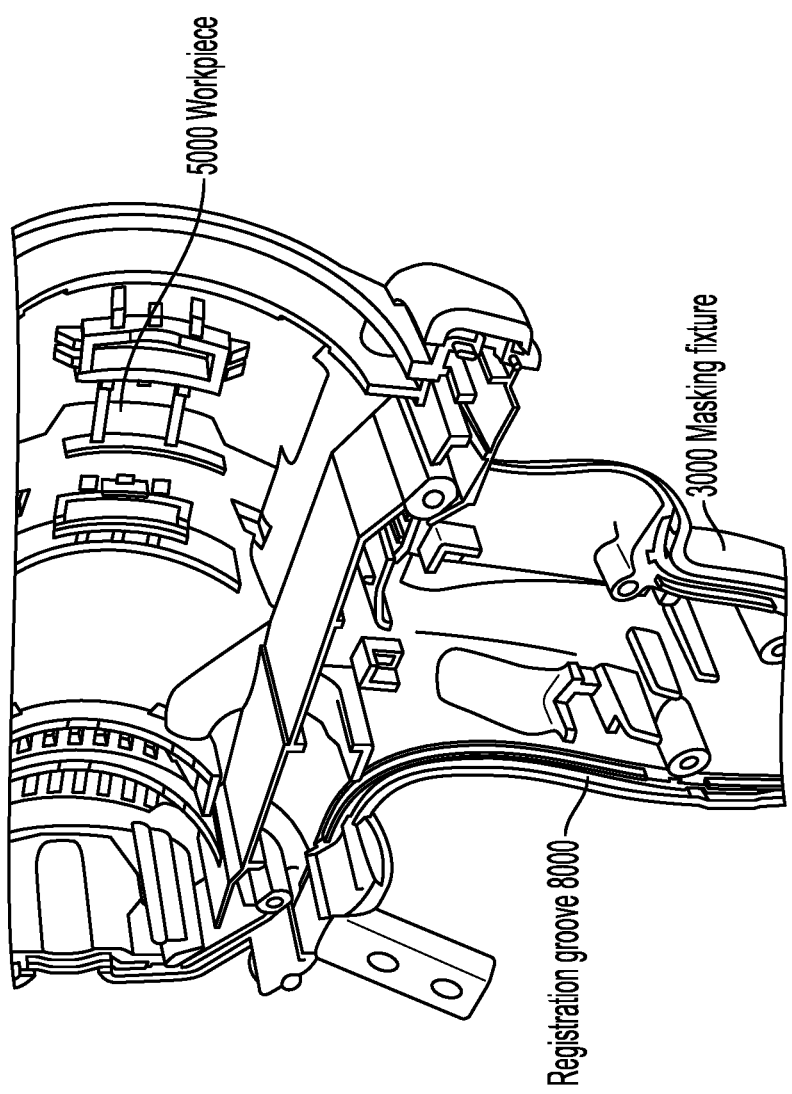
FIG. 8 shows an oblique cross-section view of a workpiece fitted to a masking fixture according to the present inventions.

FIG. 8 depicts workpiece 5000 fitted to masking fixture 3000, showing clearly how the masking fixture is closely contoured to the workpiece so as to both hold it in place and serve a masking function during printing. Registration groove 8000 is also shown, indicating how workpiece 5000 and masking fixture 3000 may be aligned via a precise conformational fit.

In some embodiments, the masking fixture may include a plug-like portion that is sized to fit into a recess on the workpiece, such that the recess is filled during dipping.

Figure 9:
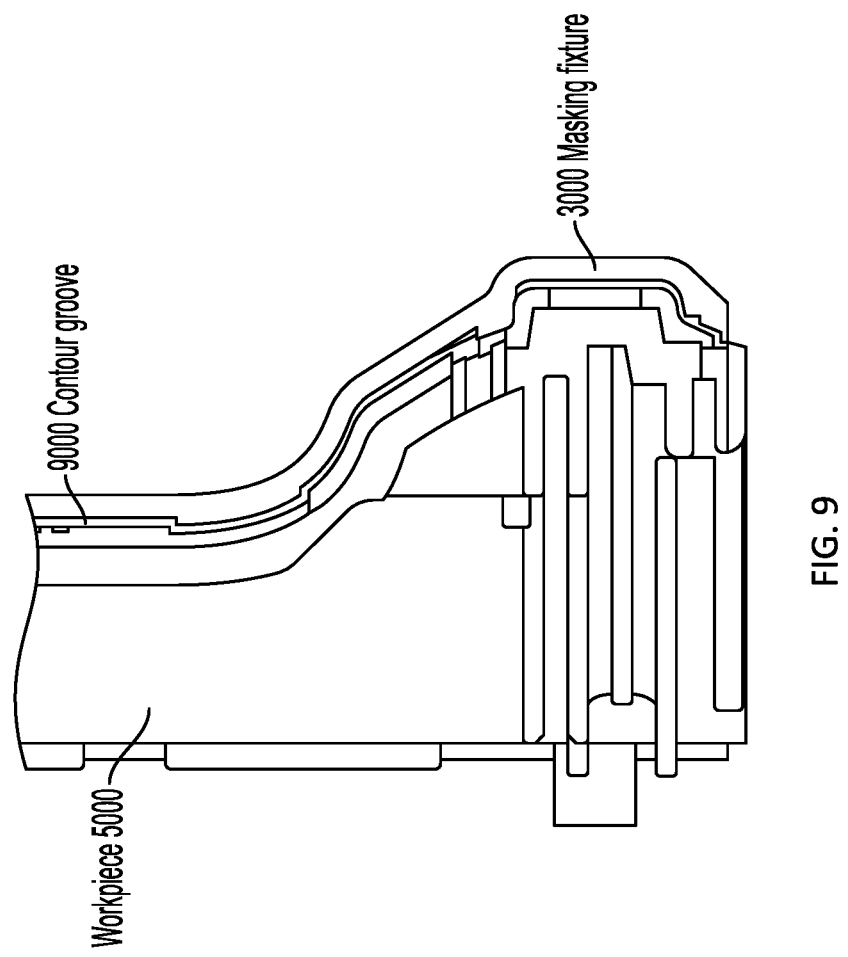
FIG. 9 shows an alternate cross-section view of a workpiece fitted to a masking fixture according to the present inventions.

FIG. 9 shows a partial cross-section of a workpiece 5000 fitted to a masking fixture 3000, again showing the close fit between the two parts for, among other things, the masking function. Also shown is contour groove 9000 formed by the nesting of workpiece 5000 within the contoured shape of masking fixture 3000, which facilitates attachment and removal via friction fits such a slip fit or other known fits. The fit of the workpiece with the masking fixture may be used to guide the two together during attachment, as a registration means, a way to line up the two parts so that they fit together easily. In some embodiments, a channel or groove in the masking fixture may be designed to fit a ridge on the workpiece for alignment, for example, in a hand-in-glove fashion.

When it comes to dipping the workpiece onto a printed sheet of hydrofilm and into a dip tank, system 340 and/or product dipping assembly 260 may dip the workpiece into the dip tank using multi-functional masking fixture 290. In some embodiments, the multi-functional masking fixture is operable to cover a designated portion of a workpiece via a masking piece, and the masking piece may further include a holding portion operable to reversibly secure the workpiece to a movable support for the dipping process, facilitating movement of the workpiece into and out of a dip tank.

In some embodiments, the multi-functional masking fixture is contoured to a portion of the workpiece, such as a grip portion or a bumper portion of a power tool or a power tool accessory. In some cases, a masking fixture may be configured to create a void between itself and the workpiece. Such a void may allow contact of a hydrofilm portion with a portion of the workpiece that is proximate to the void. Further, multiple voids may be created, for example, to allow two or more hydrofilm graphics on the workpiece to be placed within one or more void areas.

In some embodiments, the multi-functional masking fixture further comprises a holding portion operable to facilitate movement of the workpiece into and out of a dip tank. In some embodiments the masking piece may be manufactured from a rigid material. Examples of rigid materials include, but are not limited to, a plastic, a polymer, a metal, or a composite material. Alternatively the workpiece may be made from a flexible material, such as a thermoset, a plastic, a rubber, a gel, a film, a tape, or a thermoplastic elastomer.

In a further embodiment, the rigid material may be selected for its use as an output of a 3D printer. A 3D printer may be used to print a workpiece or masking fixture, allowing for workpieces to be printed on-demand or to rectify a shortage in inventory. 3D printing may be desired for creating custom masking fixtures, such as would be necessary to create a user-selected void that is configured to facilitate placement of at least one hydrofilm graphic on the workpiece, as described above.

Workpiece

The multi-functional masking fixture is capable of attachment to the designated portion of the workpiece. Suitable means of attachment include a mechanical attachment, a friction-fit, a chemical attachment, a pneumatic attachment, or a magnetic attachment. When a powered device is being hydrofilmed, the workpiece may be adapted to cover a designated portion of the workpiece, for example a vent opening, a grip portion, a portion of the workpiece that differs in material composition from another portion of the workpiece, a portion adorned with a graphic, a portion adorned with a sticker, an ornamental feature, a bevel, an electrical contact, a data transfer contact, an antenna, a wireless transfer receiver, a wireless power beaming receiver, a port, or a branded logo. For example, when the workpiece the workpiece may be necessary to cover at least a portion of a housing of a power tool or a power tool accessory. In such an example, it may be necessary to cover venting holes of the power tool to minimize warping induced by the hydrofilm seeping into the venting holes.

While power tools have in general been used to describe handheld power tools, the term is also intended to cover other devices like a consumer electronic good, a white good appliance, a cordless power tool, or a corded power tool. In addition to power tools, the attributes of the workpiece, like the materials of the workpiece and the use of voids are also applicable to items like a bit, a blade, a battery pack, a charger, a stand, a case, or a cord. It is also contemplated that the workpiece may be a hand tool, a collection of hand tools, a storage product, a consumer good, disposable packaging, or a hand-held equipment carrying case.

Alternatively, the workpiece comprises at least one of a gardening tool, a riding mower part, a tool part, a vehicle part, a replacement part, a fire suppression component, a video surveillance component, a video camera, an access control component, a monitoring station, a structural fastener, an air compressor, a nailing gun, a blade, a bit, a drill bit, personal protection equipment, eye wear, underwater equipment, a welder, a welding mask, a vending machine, a CribX™, a remote vending machine, industrial hardware, a fastening tool, a pneumatic tool, a critical application fastener device, a rivet and lockbolt system, a speed fastening tool, a stud welding tool, an engineered assembly tool, a single spindle system, a multi-spindle system, a fixtured tool, an articulating arm assembly tool, a power generator housing piece, a drill bit case, a drill tip case, a hole saw carrying case, a Heli-Coil® tool, a Pop® tool, a Masterfix® tool, or a Spiralock® tool.

Holding Portion

In some embodiments, the holding portion of the multi-functional masking fixture is reversibly attachable to a support structure configured to hold the holding portion. As it is a goal to place customized hydrofilm graphics on a product using just-in-time manufacturing processes, the holding portion permits reversible attachment of the masking piece for quick placement and removal after hydrofilm dipping. In order to facilitate hydrofilm dipping, the holding portion may be adapted to be suspended from a gantry, a robotic arm, a pneumatic attachment, or a component of a conveyor system. Attachment mechanisms to allow reversible attachment may be achieved by means of a magnetic attachment, a chemical attachment, or a mechanical attachment. Alternatively the holding portion is permanently affixed to at least one of a gantry, a robotic arm, or a component of a conveyor system.

Dipping

In some embodiments, the masking piece is operable to substantially exclude at least one of fluid or pigment from the designated portion of the workpiece when the masking piece is attached to the workpiece, and when the workpiece is submerged in fluid. The movement of the workpiece into and out of a dip tank may be facilitated by securing the holding portion to at least one of a robotic arm, a device for manual dipping, a component of a gantry system, or a component of a conveyor belt system.

In some embodiments, the masking piece includes one or more openings that function as a stencil or one or more grooves in the workpiece. Grooves in the workpiece may be used to conform to one or more protrusions of the masking piece The conformance of the grooves of the workpiece to the one or more protrusions of the masking piece promote alignment between the workpiece and the masking piece. Such an alignment in turn supports a higher fidelity print of the hydrofilm graphic, especially when the conformance minimizes movement of the workpiece within the mask. Alternatively, grooves may be used to create one or more shadow grooves as a design element on the final printed product.

In a still further embodiment the masking piece or the holding portion includes at least one identifier code. The identifier code may be used to uniquely identify the workpiece throughout the just-in-time manufacturing process and associate the custom graphic with the right workpiece and customer order. The identifier code may be selected from an alphanumeric code, a bar code, a QR code, or an RFID tag.

In some embodiments, the masking piece is adapted to fit either a right or left-hand portion of the workpiece. In such an embodiment, the left-hand portion of the workpiece is connected via a bridge portion to a masking piece corresponding to a right-hand portion of the workpiece. When a bridge is used, the orientation of the bridge to the dipping means may be optimized to ensure the angle in which the masking piece aligns to the dipping means reduces distortion of the hydrofilm application to the workpiece.

A method of fluid transfer printing is also provided. The method comprises a number of steps including reversibly attaching a workpiece to a multi-functional masking fixture; suspending the workpiece and attached multi-functional masking fixture from a support structure via a holding portion of the multi-functional masking fixture; lowering the multi-functional masking fixture and attached workpiece into a fluid for fluid transfer printing, whereby a masking portion of the multi-functional masking fixture covers a designated portion of the workpiece; raising the workpiece and attached multi-functional masking fixture out of the fluid; and removing the workpiece from the multi-functional masking fixture; wherein the removed workpiece results in a hydrofilmed workpiece.

In some embodiments, the method further comprises matching the workpiece with the multi-functional masking fixture via one or more codes associated with the workpiece and the multi-functional masking fixture. The one or more codes associated with the workpiece and the multi-functional masking fixture may be selected from a machine-readable code, like a bar code, an encrypted image, or a QR code.

In some embodiments, the method further comprises preparing the workpiece for hydrodipping. Preparation of the workpiece may include mechanically cleaning the workpiece, chemically treating the workpiece, or heating the workpiece. Mechanically cleaning the workpiece may be accomplished by sandblasting the work piece, air blasting the work piece, scouring the workpiece, polishing the workpiece, or buffing the workpiece. Preparation may be complimented by rinsing the workpiece in an aqueous solution to remove debris followed by drying the workpiece. Alternatively chemically treating the workpiece may be performed. Chemically treating the workpiece may be accomplished by rinsing the workpiece in an aqueous solution, applying a base-coat primer, immersing the workpiece in an electrolysis bath, applying an acid, dehydrating the workpiece, applying a rust remover, applying a coating, or applying a chemical sealant. The preparation step may precede or follow reversibly attaching a workpiece to a multi-functional masking fixture.

In some embodiments, the workpiece preparation step comprises acts of washing the workpiece; drying the workpiece; cooling the workpiece; applying a base coat of primer, whereby the base coat of primer enhances an adhesive bond between a surface of the workpiece and a fluid transfer film; flashing the workpiece; heating the workpiece; and cooling the workpiece to a desired temperature. In some instances, it may be beneficial to include additional acts of allowing the hydrofilmed workpiece to dry; rinsing the hydrofilmed workpiece; drying the hydrofilmed workpiece; applying a top coat to the hydrofilmed workpiece; and flashing the topcoated hydrofilmed workpiece. In a further embodiment, the method may further comprise applying a second top coat to the topcoated hydrofilmed workpiece; heating the second topcoated hydrofilmed workpiece; and allowing the second topcoated hydrofilmed workpiece to cool down to an ambient temperature. The top coat may be selected from at least one of a clear coat to protect the placed hydrofilm graphic, a urethane or polyurethane coating to enhance impact resistance, or a coating to enhance an aesthetic of the finished product. For example, a top coat using a high gloss coating or an enamel coating could be used.

In some embodiments, the method may include removing a hydrofilm residue from the multi-functional masking fixture. Removing the hydrofilm residue from the multi-functional masking fixture may be accomplished by mechanically removing the hydrofilm residue from the multi-functional masking fixture. Alternatively, the hydrofilm residue may be removed by applying an abrasive surface to the masking fixture, for example by sandblasting the multi-functional masking fixture; or chemically dissolving the hydrofilm residue from a surface of the multi-functional masking fixture.

In some embodiments, the method may include disassociating a unique identifier from the multi-functional masking fixture that associates the multi-functional masking fixture with the workpiece.

In some embodiments, the method may include inspecting the multi-functional masking fixture for a mechanical defect. Inspection may be accomplished by manually inspecting the finished product, or using a technology like computer vision to compare the finished product with the expected finished result. Should the finished result not meet the expected result, automatically or manually resubmitting the order for hydrofilm printing.

In some embodiments, the method may include selecting a multi-functional masking fixture, the multi-functional masking fixture having at least one void; placing a second hydrofilm graphic on a fluid surface of the dip tank, wherein the placement of the second hydrofilm graphic aligns with the at least one void when the multi-functional masking fixture is dipped into the dip tank; and dipping the multi-functional masking fixture and workpiece into the dip tank.

In some embodiments, the method may be modified to create a visual effect or a functional effect. A visual effect could be achieved by placing a second hydrofilm graphic on the workpiece. A functional visual effect comprises at least one of a control of light effect, a diamond plate pattern, a stacked graphic effect, or a shadow effect. Using a second hydrofilm graphic may make it possible to add an electrical insulator layer.

In some embodiments, the system for masking multiple workpiece housings in a custom fluid transfer printing application comprises a first masking piece, wherein the first masking piece covers a left side of a workpiece housing; a second masking piece, wherein the second masking piece covers a right side of a workpiece housing; a bridging piece, wherein the bridging piece removably connects the left side of the workpiece housing at a desired angle and removably connects the right side of the workpiece housing at a desired angle; and a holding portion operable to facilitate movement of the first masking piece and the second masking piece into and out of a dip tank.

The multi-functional masking fixture of clause 2, wherein the masking piece is contoured to form a slip fit, a loose fit, a free fit, a press fit, a tight fit, or a shrink fit.

Multi-Workpiece Bracket

In some embodiments, workpieces in line for hydrodipping, for example, may be reversibly attached to a multi-workpiece bracket that is configured to hold multiple workpieces for dipping. In some embodiments, the multi-workpiece bracket is configured to hold multiple different workpieces corresponding to different shop-keeping units or SKUs. Significantly, different workpieces will likely have different positioning for dipping in the fluid transfer process. For example, a battery pack may be positioned bottom side down, with any electrical contacts masked so as to be protected from both the film and the fluid during the fluid transfer printing process. But a power tool grip part, such as is found on a power drill housing, when held by the same multi-workpiece bracket may require an angle of attack for the dipping process of about 30 degrees from vertical. Articulation joints at the various attachment points carry out this function of providing for specific positioning of specific workpieces.

Articulation joints may be controlled remotely via an actuator connected electronically to a control circuit and a user interface for making adjustments. In some embodiments, pairs of mirror image parts representing two halves of a tool or accessory may be positioned at the same angle relative to vertical so that dipping for both pieces is symmetrical. Advantageously, this will result in a uniform printing pattern when the two halves are assembled post-printing.

Figure 10:
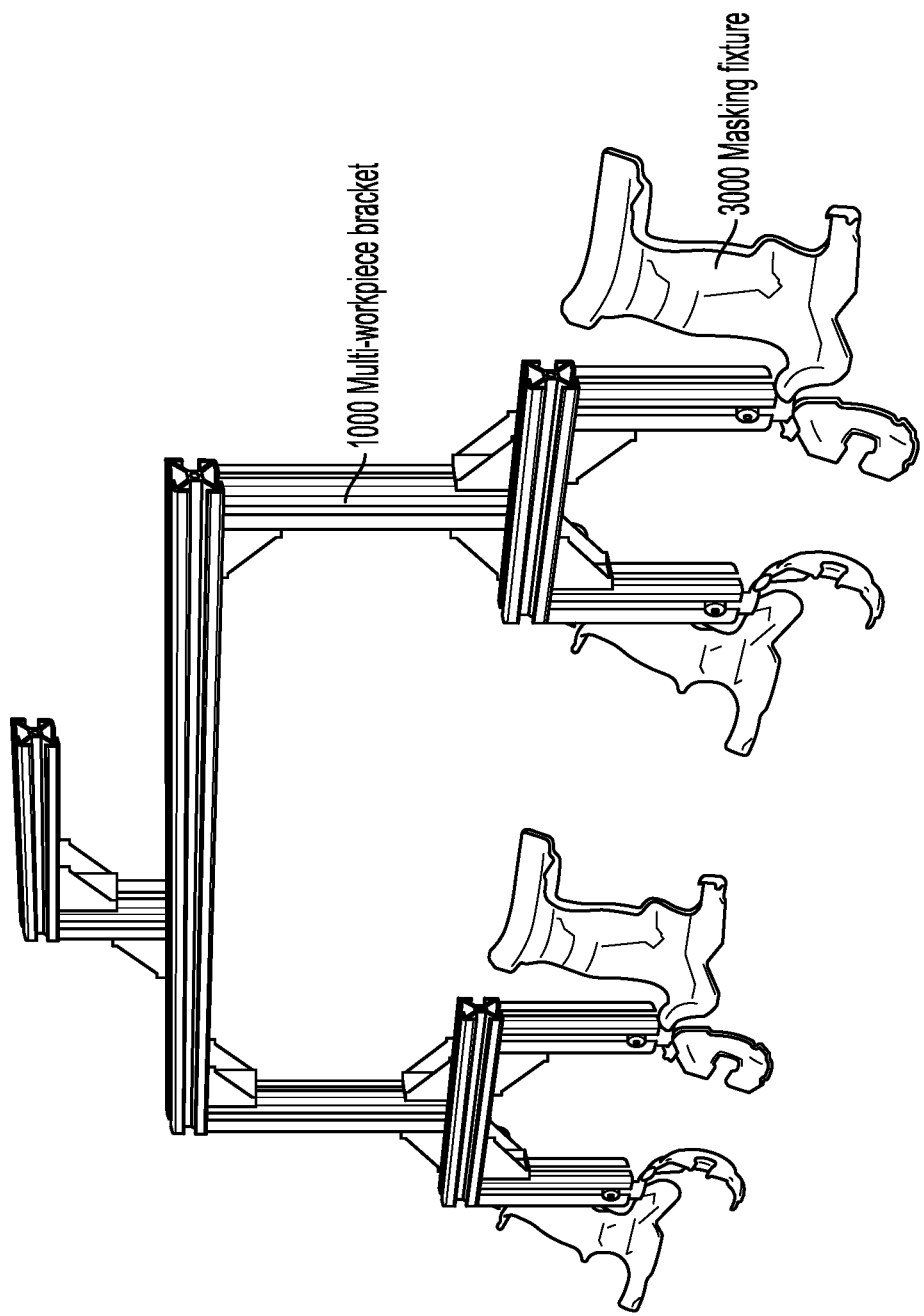
FIG. 10 shows an embodiment of a multi-workpiece bracket according to the present inventions.

Turning now to FIG. 10, multi-workpiece bracket 1000 is depicted supporting four workpieces, in this example four of masking fixture 3000. In some embodiments these workpieces may each be different from the others, set in pairs as in FIG. 5, or in other arrangements appropriate to the item being printed. Upper limits of the number of workpieces that can be supported by a single bracket will be determined by the dimensions of the dipping tank to be used and the size of the workpieces, but advantageously, the multi-workpiece bracket of the instant patent application makes it possible to print many different items simultaneously, including different products with different print designs in a single dipping run, allowing for printing to be done at a larger scale than in existing fluid transfer dipping methods.

Figure 11:
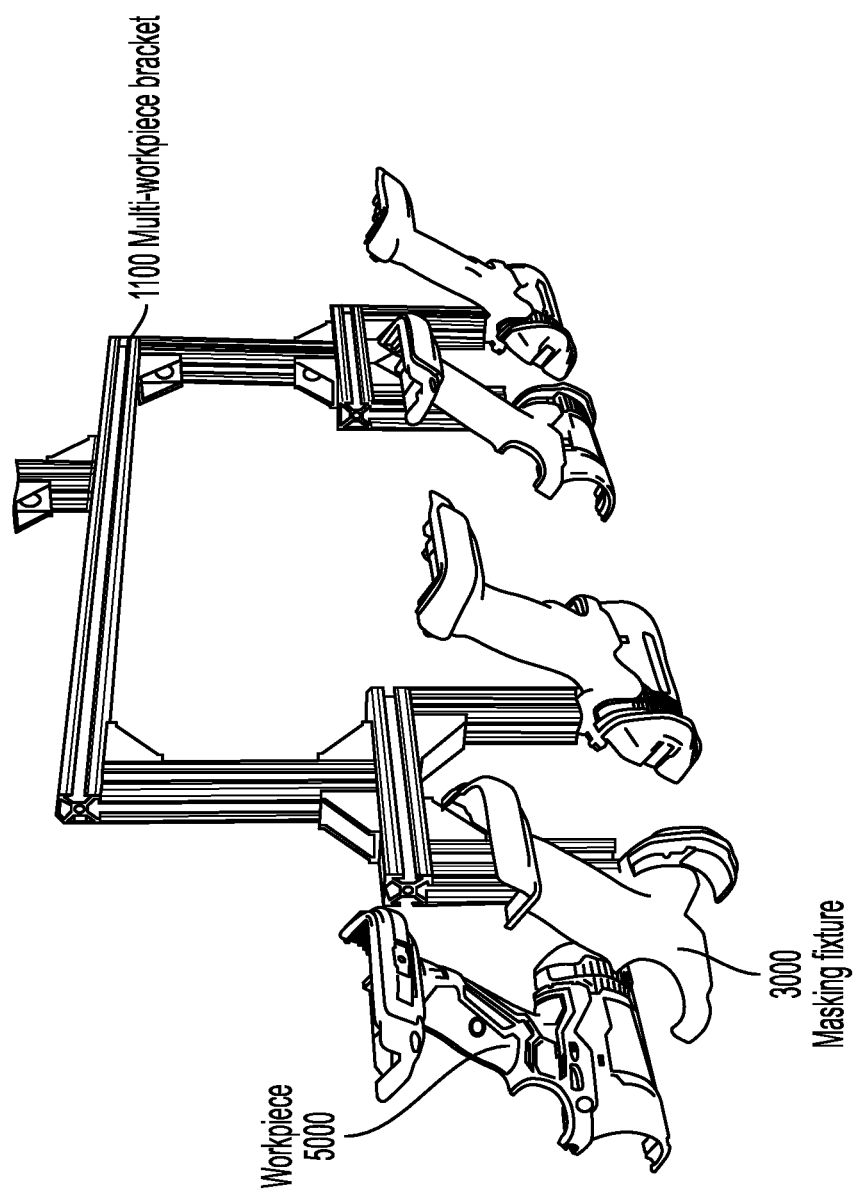
FIG. 11 is a view of a workpiece, masking fixtures, and a multi-workpiece bracket according to the present inventions.

Turning now to FIG. 11, an embodiment is shown in which a workpiece 5000, in this case a power tool housing portion, is positioned in space slightly above, and aligned with, masking fixture 3000. This shows how workpiece 5000 may be contoured to fit within masking fixture 3000 when placed together.

Accordingly, a compound bracket for holding a plurality of workpieces may be used to dip the workpiece into the dip tank. In some embodiments, the compound bracket may include a support structure having a plurality of attachment points; wherein each attachment point is operable to suspend a workpiece during a dipping step of a fluid transfer printing process; and wherein each attachment point is independently adjustable to a range of angles relative to a horizontal surface or from a vertical position.

In some embodiments, the compound bracket may be adjusted according to information from a quick response (QR) code or RFID associated with a specific workpiece, including information about a desired angle with which to suspend the specific workpiece during a dipping process. Further, a compound or multi-workpiece bracket 1100 may include one or more actuators operable to adjust one or more of the attachment points to a desired angle in response to an electronic signal, for example from controller 1500, or in response to a detected QR code including angle setting information for a specific workpiece. Accordingly, actuators may be configured to receive an electronic activation signal from a QR or RFID code reader. In some embodiments, actuators are operable to independently adjust the one or more attachment points in response to a plurality of QR code reader signals specifying a respective plurality of desired attachment point angles, each desired attachment point angle corresponding to a respective specific workpiece having a corresponding QR code that includes information about an attachment point angle for hydrodipping.

Coordinated Fluid Transfer Printing

Figure 12:
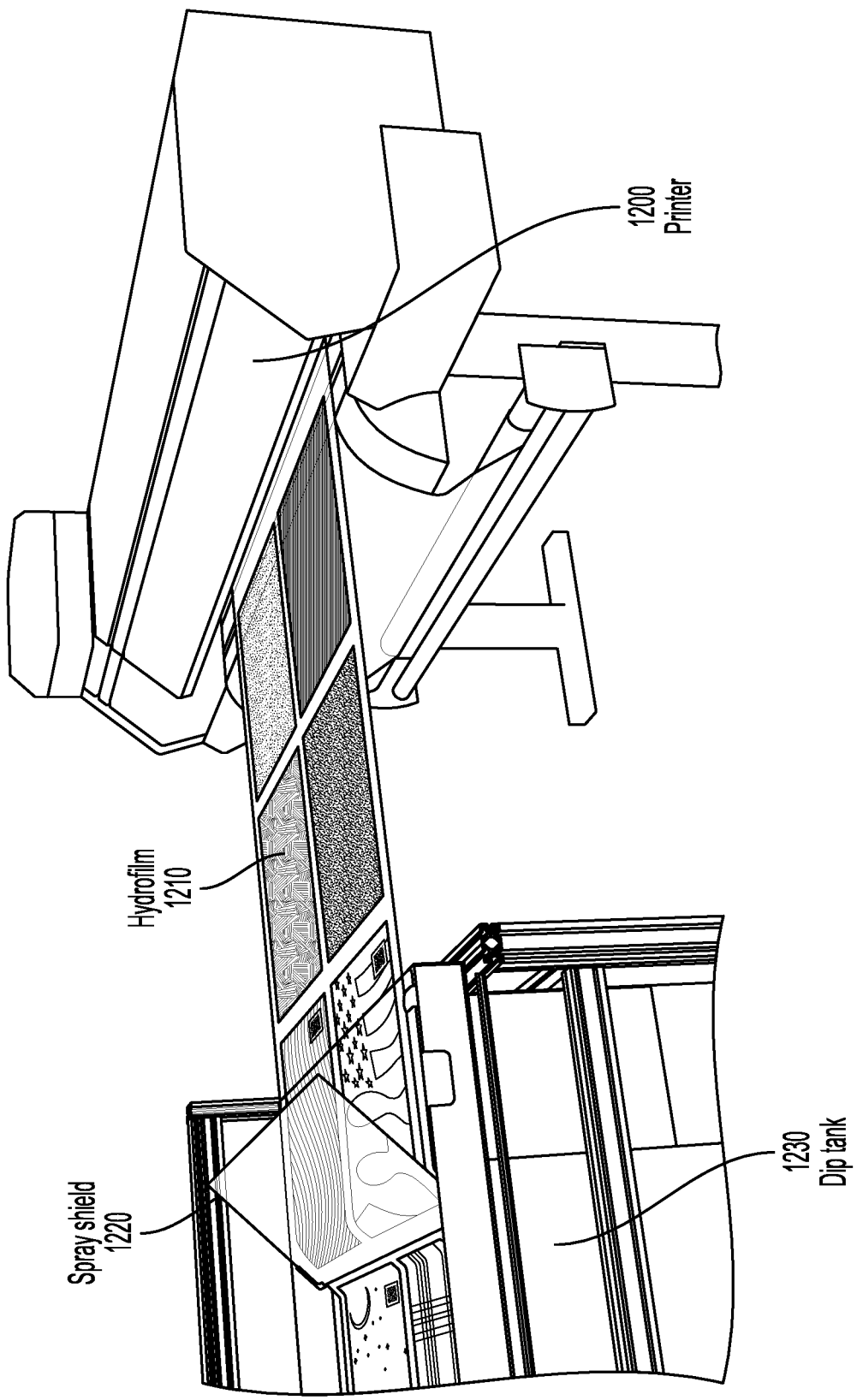
FIG. 12 shows a printer and dip tank configuration according to the present inventions.
Figure 13:
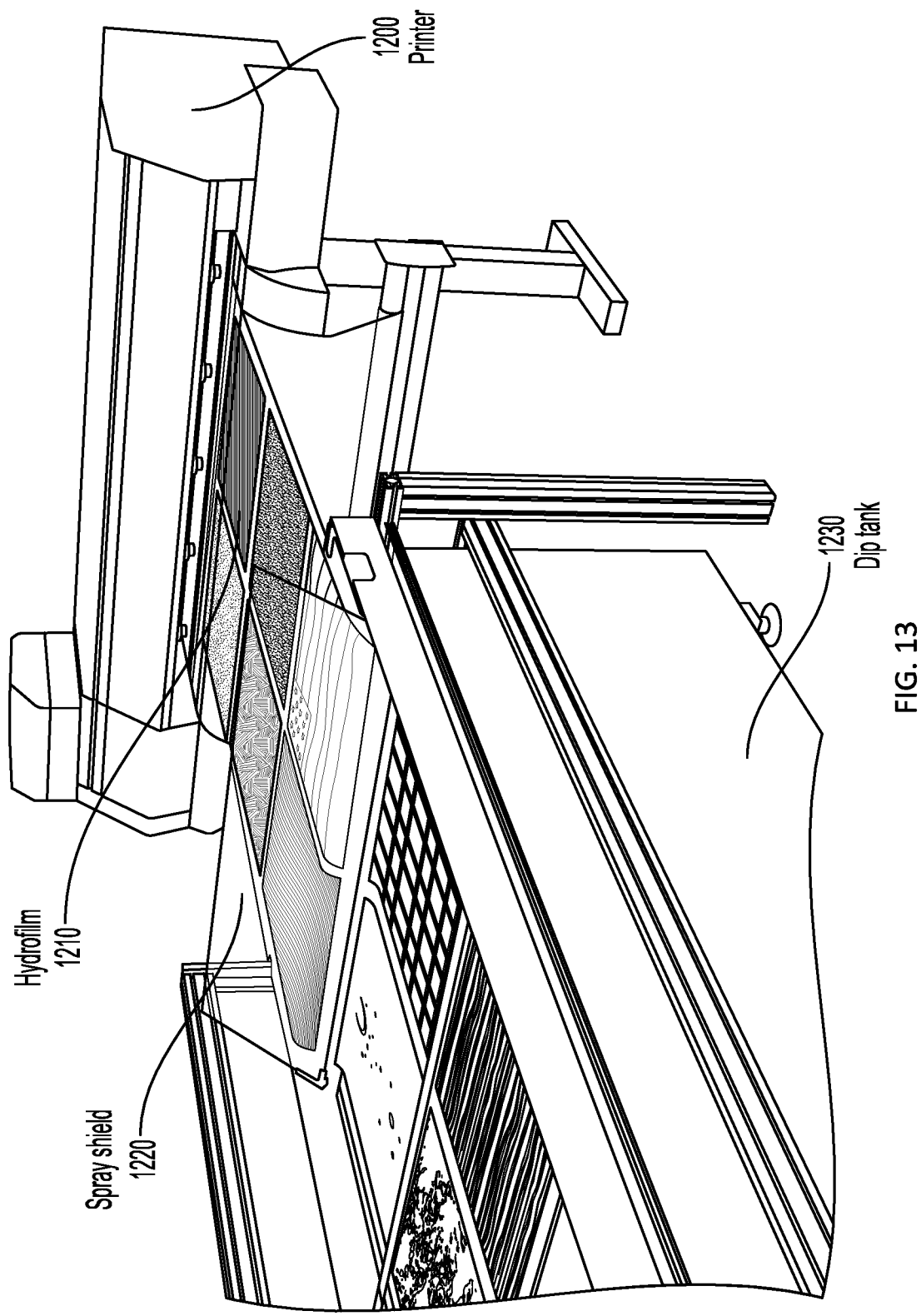
FIG. 13 shows a different view of a printer and dip tank configuration according to the present inventions.

In some embodiments of the instant patent application, multiple print designs may be printed onto a single sheet of hydrofilm for mass printing of products. For example, as shown in FIG. 12, printer 1200 may print a number of different designs onto hydrofilm 1210, which can be fed in a continuous sheet to dip tank 1230 for the fluid transfer printing process to continue. FIG. 13 provides a different view of printer 1200 and dip tank 1230, also showing spray shield 1220, which may serve to protect the portion of hydrofilm 1210 that is adjacent to dip tank 1230 from any splashing that may take place as products are dipped into dip tank 1230.

In order to coordinate a specific print design with the matching product according to a customer order, an identifier may be printed on a portion of the hydrofilm including the specific print design so that only a product with a matching identifier may be dipped onto that portion of the hydrofilm. Examples of identifiers include bar codes, QR codes, RFID tags, or any other means of identifying a specific design portion of a hydrofilm.

Figure 14:
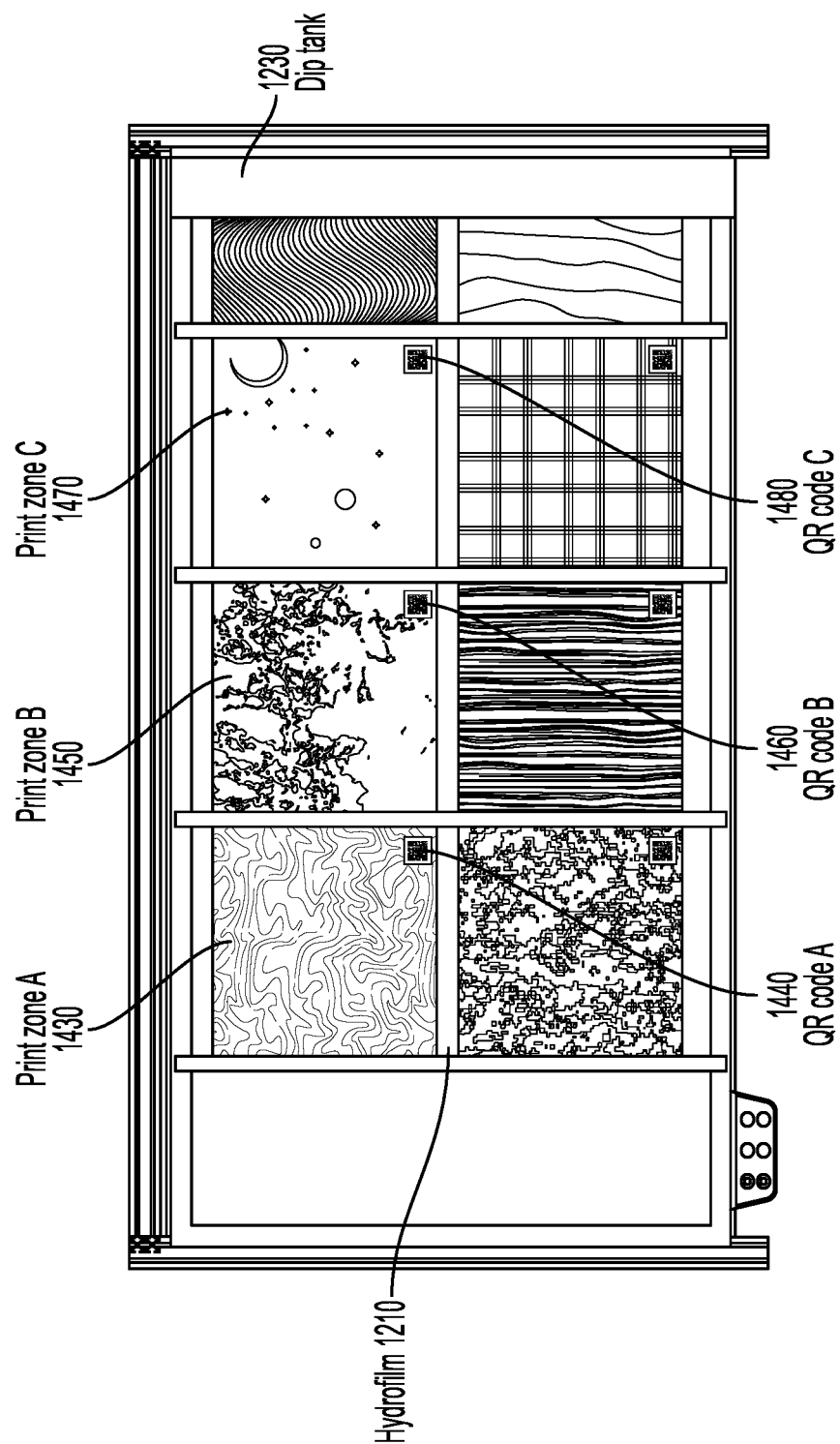
FIG. 14 shows a top-down view of a dip tank including a printed hydrofilm sheet according to the present inventions.

For example, FIG. 14 shows a top-down view of dip tank 1230 having hydrofilm 1210 on the surface of the fluid in the tank. In this embodiment, hydrofilm 1210 is divided into multiple zones, each comprising a different print design and a different QR code identifier. Specifically, print zone A 1430 includes QR code A 1440 in a corner of the print design. Further, print zone B 1450, having a different print design, includes QR code B 1460 in a corner of the print design. And finally, print zone C 1470, having yet another print design, includes QR code C 1480 in a corner of the print design.

Figure 15:
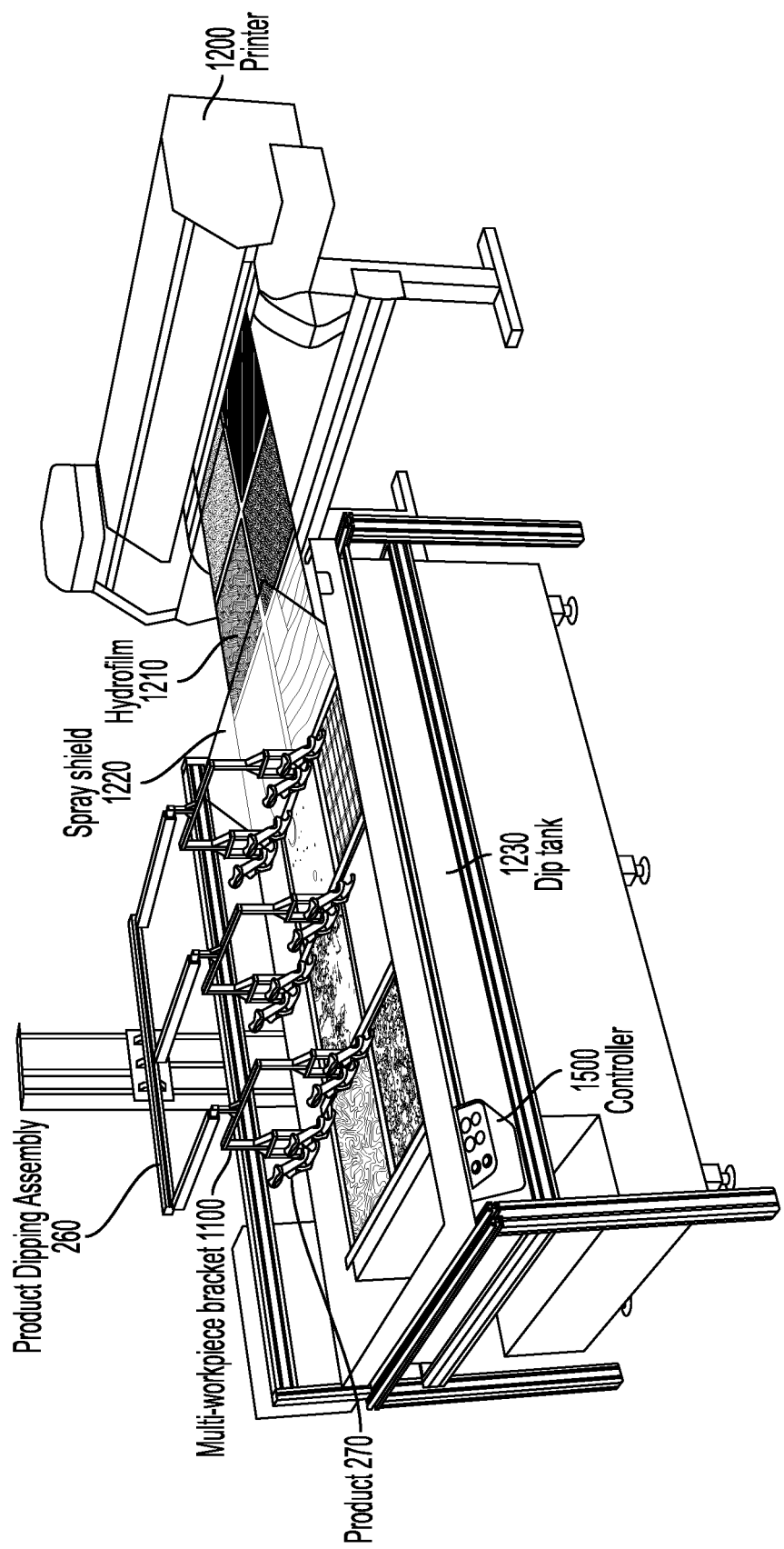
FIG. 15 shows a printer and dip tank layout with multiple workpieces supported above a hydrofilm sheet including multiple print designs for fluid transfer printing.
Figure 16:
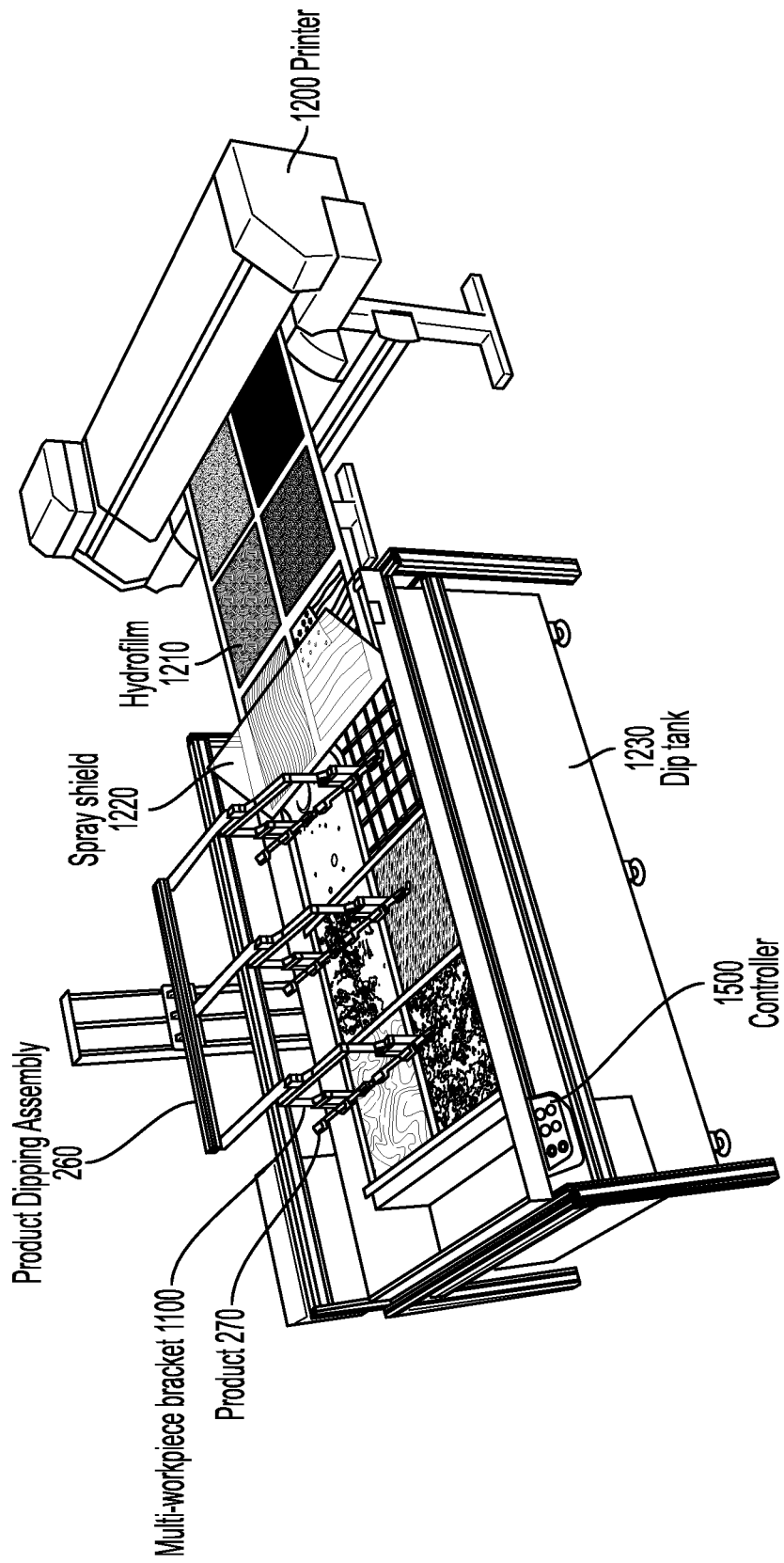
FIG. 16 shows a different view of a printer and dip tank configuration according to the present inventions.
Figure 17:
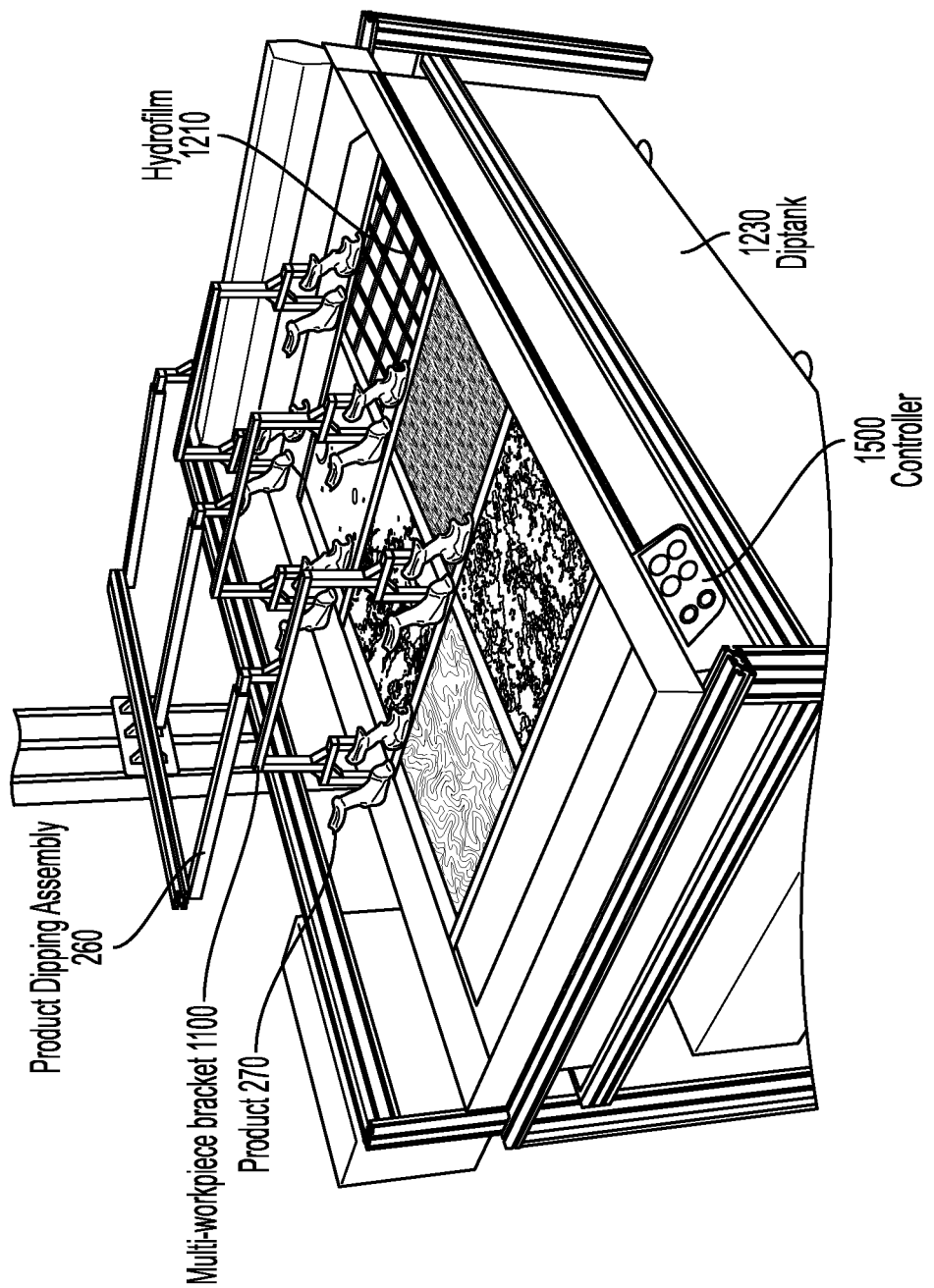
FIG. 17 shows a perspective view of a set of workpieces supported above a hydrofilm sheet laid within a dip tank for fluid transfer printing.
Figure 18:
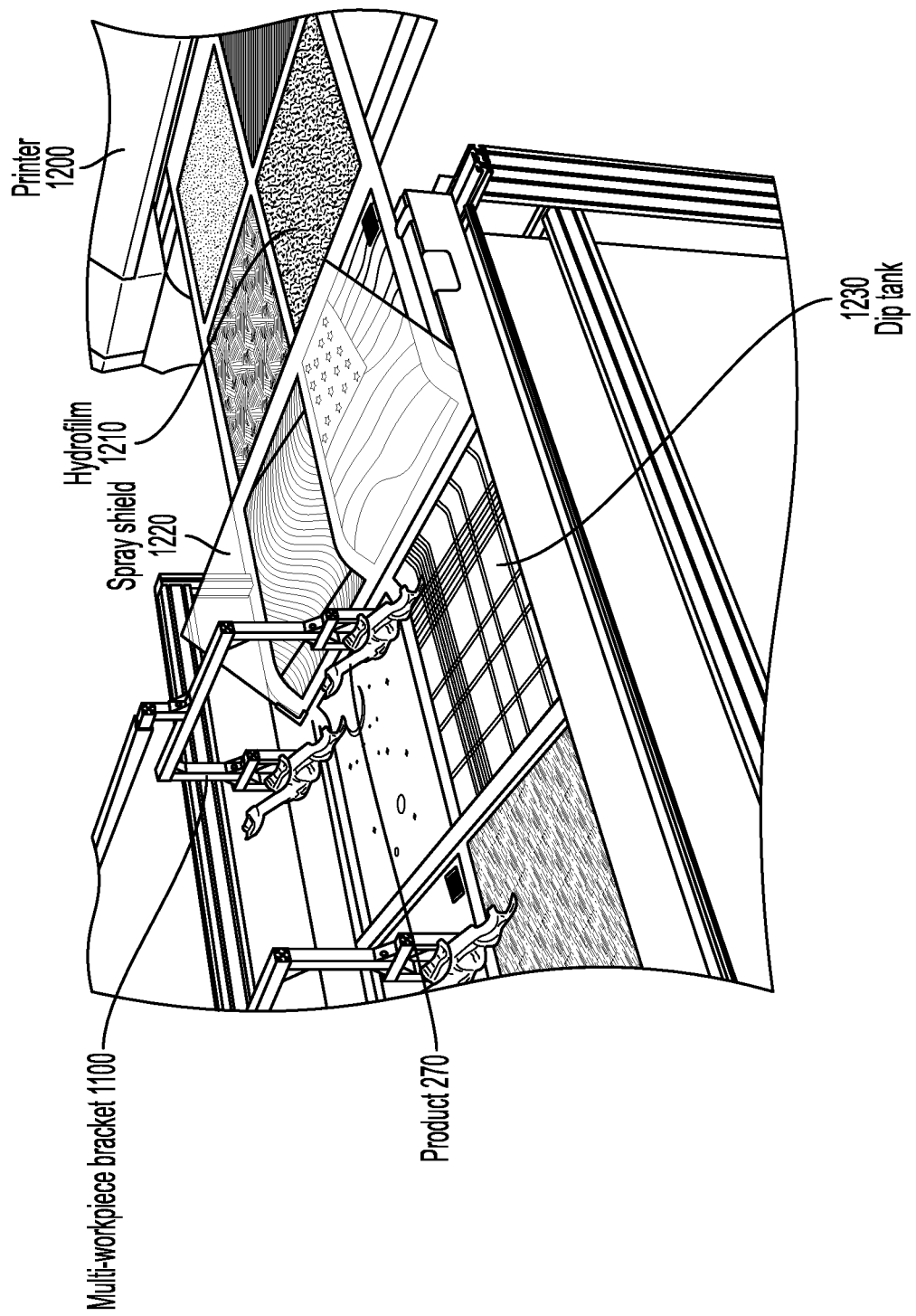
FIG. 18 shows a hydrofilm sheet extending from a printer to a dip tank for automated fluid transfer printing according to the present inventions.
Figure 19:
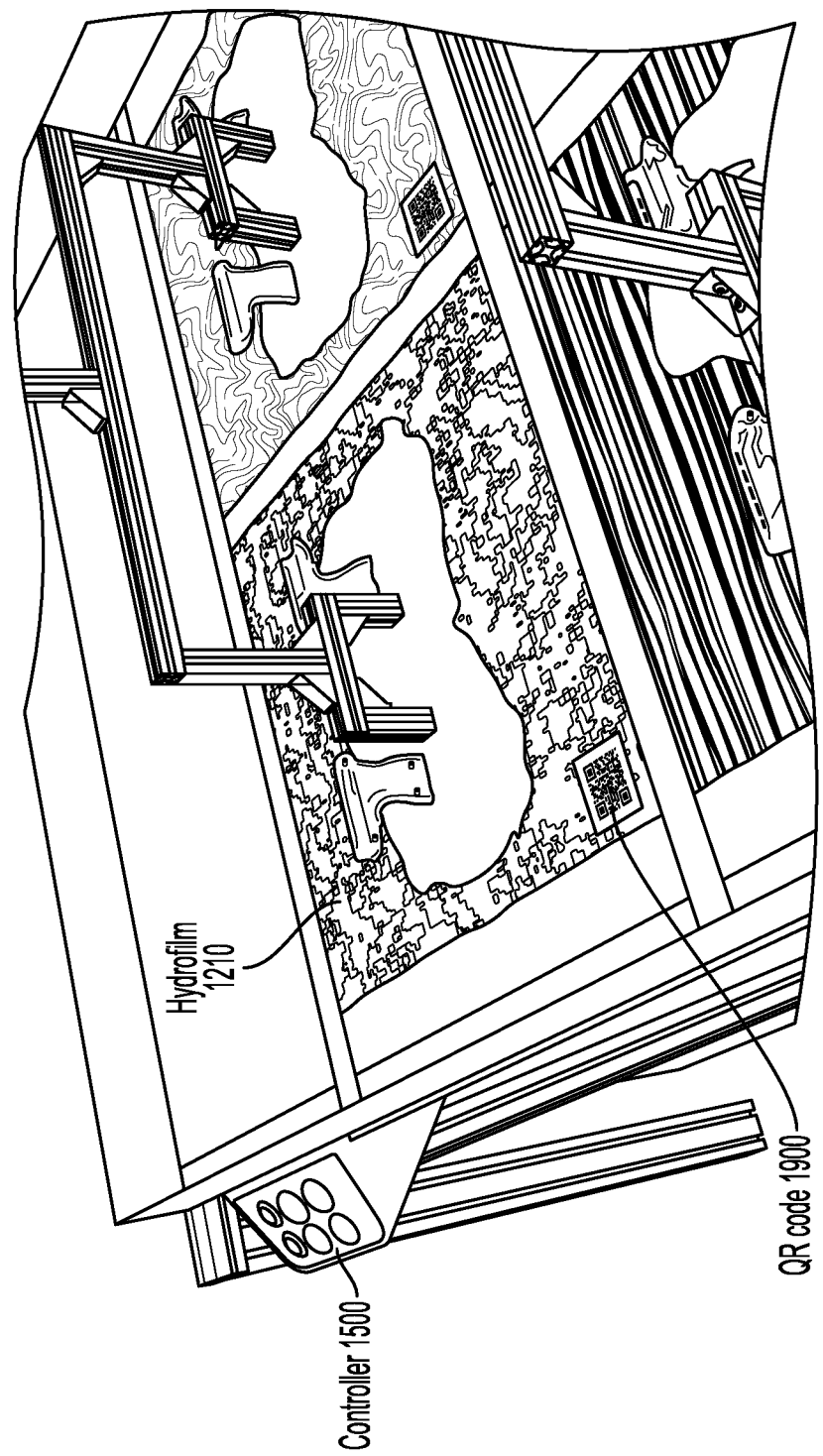
FIG. 19 shows a portion of a dip tank including partially submerged workpieces in the process of fluid transfer printing.

Turning now to FIG. 15, the printer and dip tank arrangement of FIG. 13 is shown with product dipping assembly 260 in place. In this embodiment, product dipping assembly includes support arms that extend three of multi-workpiece bracket 1100 in position over dip tank 1230. Each multi-workpiece bracket 1100 in turn supports four of product 270. Further, controller 1500 is shown as a control panel with controls for either manually or automatically lowering and raising product dipping assembly 260 in order to carry out the dipping process. FIGS. 16-19 provide alternate views of the arrangement shown in FIG. 15.

Figure 20:
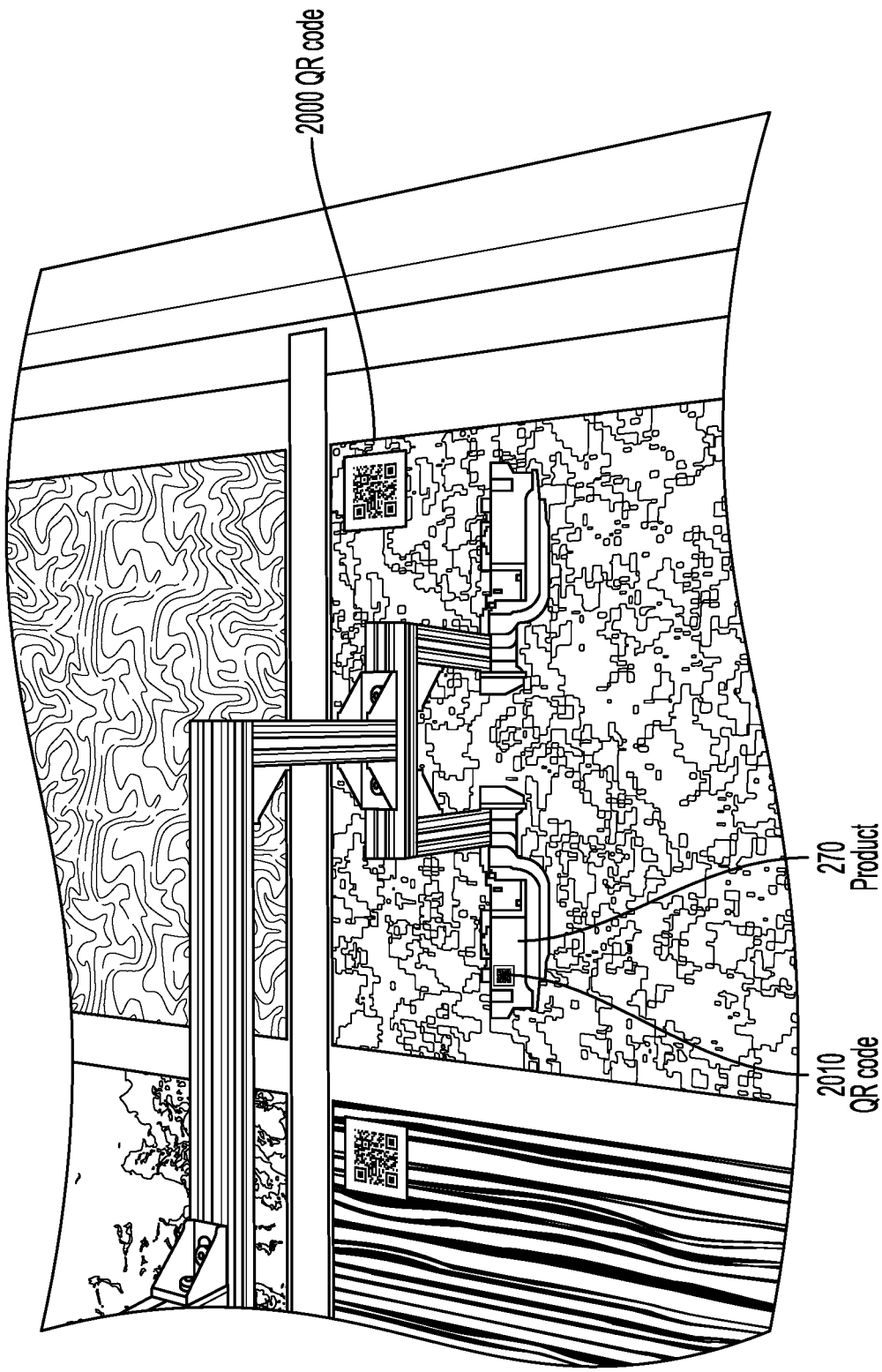
FIG. 20 shows a portion of a dip tank including partially submerged workpieces in the process of fluid transfer printing, including corresponding QR codes on a workpiece and hydrofilm sheet portion.

Turning now to FIG. 20, shown is a workpiece or product 270 having QR code 2010 being lowered onto a print design having corresponding QR code 2000. In this way, matching QR codes provide for coordination between product and print design and hydrofilm zone. Similarly, non-matching QR codes between product and print design may trigger an alert indicating that a product may be positioned above a non-matching print design, and that dipping should not proceed.

Figure 21:
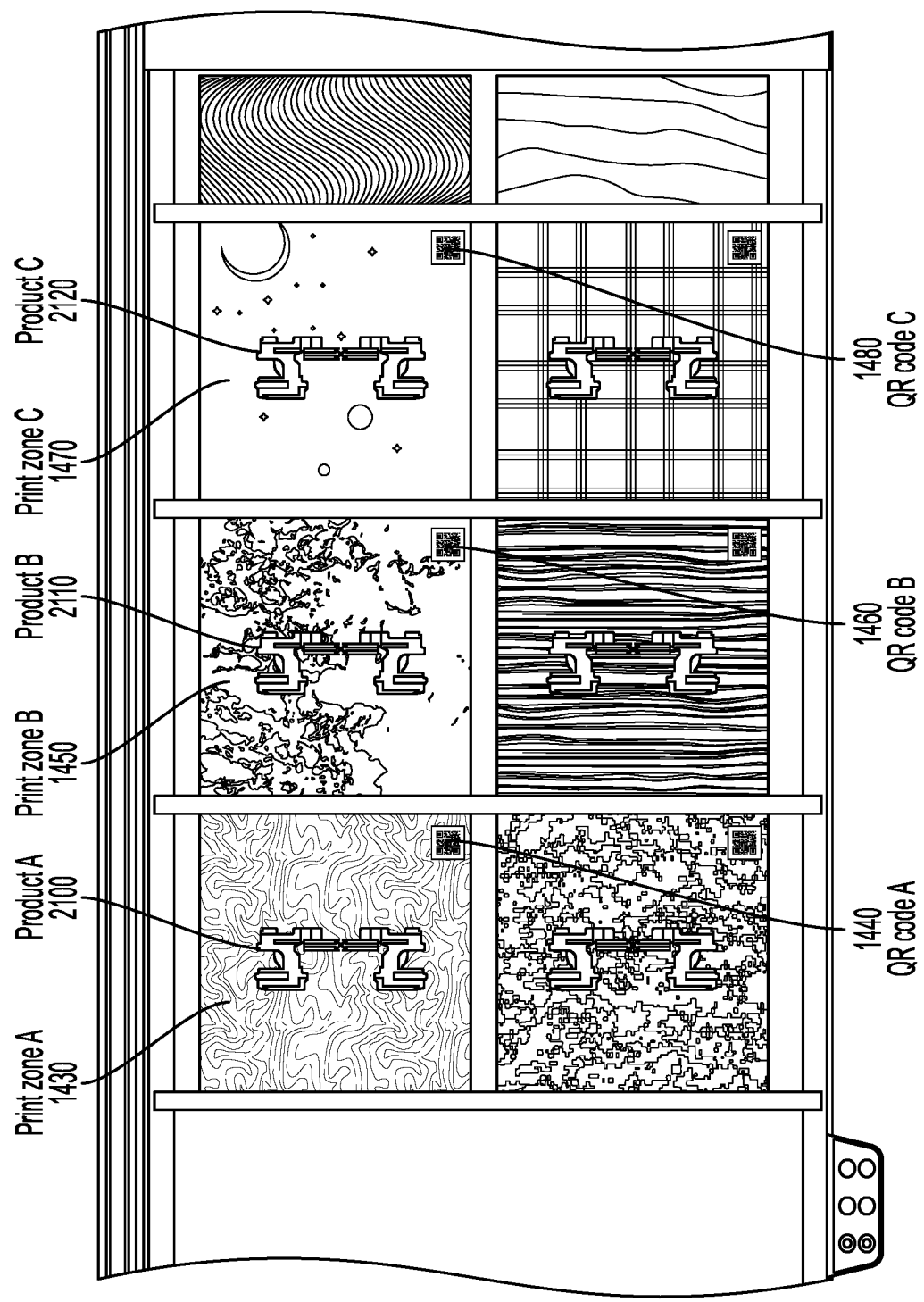
FIG. 21 shows a top-down view of a dip tank and hydrofilm sheet with a set of print zones, a corresponding set of QR codes, and a corresponding set of products for fluid transfer printing according to the present inventions.
Figure 22:
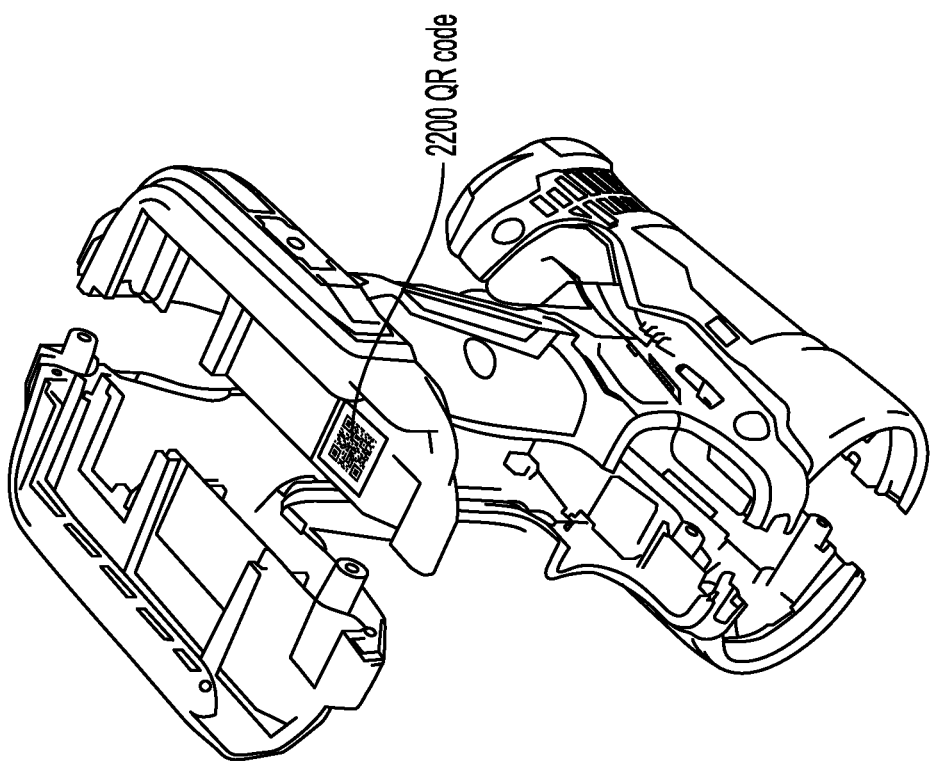
FIG. 22 depicts a perspective view of a product or workpiece, showing a QR code on a portion of the product or workpiece.

Turning now to FIG. 21, the top-down view of FIG. 14 is shown with products positioned above each of the corresponding print zones with matching QR codes. FIG. 22 shows a close-up view of a workpiece with a QR code visible on a portion of the workpiece.

Figure 45:
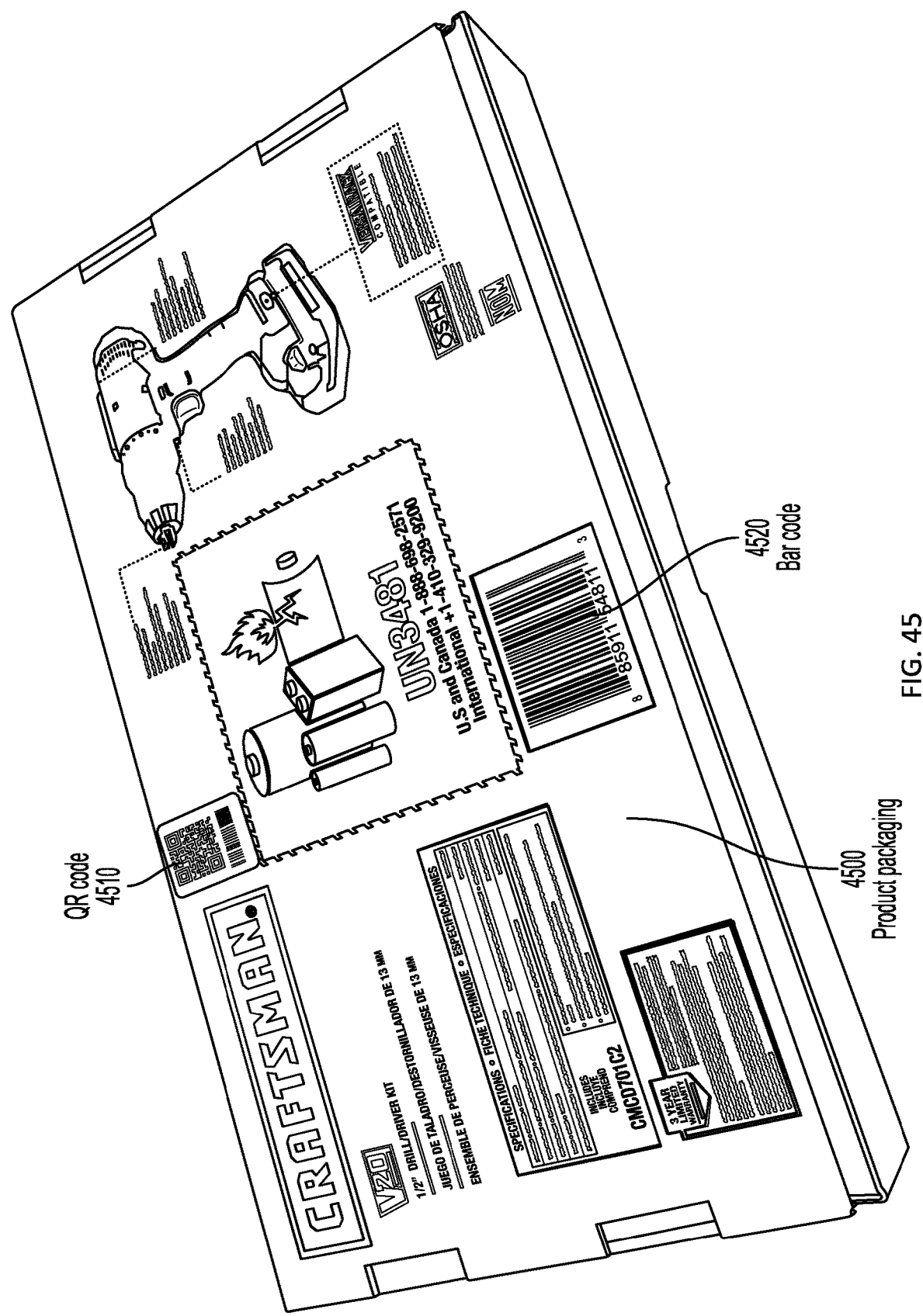
FIG. 45 is a representation of product packaging showing product and design identifiers.

With reference to FIG. 45, shown is product packaging 4500 on which is visible identifier information, e.g., QR code 4510 corresponding to, for example, customer order information about the product ordered and the print design ordered. Also shown is bar code 4520 corresponding to, e.g., inventory and shipping information.

Accordingly, in some embodiments system 340 and/or product dipping assembly 260 may coordinate workpiece/hydrofilm portion pairs, wherein multiple workpiece/hydrofilm portion pairs are dipped substantially simultaneously. This may be carried out by associating one or more identifier codes with one or more of the workpiece, a multi-functional masking fixture, or the hydrofilm portion. Examples of identifier codes include a QR code, a bar code, an alphanumeric code, or an RFID tag. In some embodiments, a QR code may include a QR code that is linked to one or more of product description information, inventory SKU information, print design data information, customer billing information, and customer shipping information.

Simultaneous dipping, as used herein, refers to coordinated dipping that occurs at the same time, and substantially simultaneous dipping refers to dipping within at most 0.5 seconds of each other in some embodiments. In other embodiments, substantially simultaneous dipping may include dipping by an automated fluid transfer printing apparatus configured to dip multiple stock-keeping units onto multiple hydrofilm portions within at most ten seconds of each other.

In yet other embodiments, an automated fluid transfer printing apparatus may be configured to dip multiple stock-keeping units onto multiple hydrofilm portions sequentially. In a preferred embodiment, sequential dipping may be programmed to occur such that intervals between dippings do not exceed five minutes. Alternatively, an automated fluid transfer printing apparatus may be configured to dip multiple stock-keeping units onto multiple hydrofilm portions sequentially, with an interval between dippings of ten minutes or less.

As a structure for the function of dipping a workpiece or set of workpieces into a dip tank for fluid transfer printing, an automated structural support system according to the instant application may include structural support members such as those depicted in FIGS. 15-20. Further, automated structural support system may include product dipping assembly 260, multi-workpiece bracket 1100, or controller 1500. An electric motor or standard mechanism for raising and lowering objects may be used to effectuate movement of the workpiece or set of workpiece into and out of the dip tank. For example, an electric motor may drive movement of product dipping assembly up and down via controller 1500. Controller 1500 may be operated manually, or it may be programmed for various rates of lowering and raising according to the specific needs of the workpiece(s) being dipped. In some embodiments, controller 1500 may be programmed to effectuate simultaneous dipping of all workpieces on product dipping assembly 260. In other embodiments, controller 1500 may be programmed to stagger the dipping times to allow for activation of various hydrofilms 1210, QR code reading, RFID writing, dip tank cleaning, quality control analysis of a dipped workpiece, or other process step. In some embodiments therefore, sequential dipping intervals may be five minutes or less. In a further embodiment, product dipping assembly 260 may be programmed to carry out sequential dipping in intervals of ten minutes or less.

In some embodiments, the process of accepting a customer request for a workpiece and a customer request for a graphic design to cover at least a portion of the workpiece further comprises determining the availability of at least one of the workpiece, the graphic design, or a pre-printed hydrofilm. This determination may involve one or more of the following:

A) obtaining an indication of the availability of at least one of a desired image, text, or color of the graphic design;

B) obtaining an authorization to use the graphic design;

C) acquiring a digital file enabling reproduction of the graphic design; and

D) associating the digital file with a customer data file for the customer.

Moreover, the digital file may be associated with a workpiece so that it is trackable through printing, hydrodipping, curing, assembly, and shipping.

In some embodiments, a coordination method may include the following operations:

accepting print design data corresponding to a plurality of graphic designs;

mapping the print design data to a sheet of hydrofilm, wherein the plurality of graphic designs is arranged to facilitate hydrodipping of a plurality of workpieces corresponding to the plurality of graphic designs;

printing the print design data onto a hydrofilm portion; and hydrodipping the plurality of workpieces onto the hydrofilm portion, whereby the hydrofilm portion is bonded to the plurality of workpieces, thereby transferring the plurality of graphic designs onto the plurality of workpieces.

Additionally, modification engine 232 may associate a unique identifier for each print design with a corresponding counterpart unique identifier for each workpiece to create a plurality of print design/workpiece pairs. These pairs may then be aligned at the dip tank immediately prior to dipping by aligning the unique identifier for each print design with the corresponding counterpart unique identifier for each workpiece. As discussed above, a plurality of zones may be assigned to the hydrofilm, wherein each zone corresponds to one graphic design/workpiece pair.

With respect to the hydrofilm to be used in the fluid transfer process, hydrofilm sheets may include standard films or ultraviolet light-dissolvable films. In some embodiments, the hydrofilm may be placed onto an aqueous fluid such as water, or a non-aqueous fluid such as Novec™. In yet additional embodiments, a hydrodipped workpiece may be laser etched with customer-ordered text such as a name or a message.

Order Tracking

In certain embodiments, order tracking by system 340 may include the following operations:

a. placing an identifier code on an enclosure of an ordered item, wherein the identifier code includes at least one of order information, customer billing information, customer shipping information, print design information, printer setting information, or hydrodipping setting information;

b. placing a corresponding identifier code on at least one hydrofilm portion, wherein the corresponding identifier code includes at least information about the ordered item;

c. performing fluid transfer printing of the at least one hydrofilm portion onto the ordered item; and d. scanning the identifier code and the corresponding identifier code to confirm a match prior to shipping.

In this tracking system, the identifier code or the corresponding identifier code may include a bar code, a QR code, or an RFID tag. For example, the system may scan a QR code on a printed hydrofilm containing a graphic design corresponding to an order number, and the write that order number to the corresponding workpiece RFID tag. The RFID tag may be then attached to a workpiece such as a tool housing via adhesive or other known means of attachment.

An RFID tag may be attached to the inside of a workpiece housing, for example, to track the workpiece from retrieval from a warehouse, through fluid transfer printing or etching, to shipping and final order fulfillment.

In some embodiments, a QR code may be used to associate a graphic to the order, for example a QR code corresponding to an order number may be printed on a hydrofilm containing the graphic for an order. Order information retrieved via the QR code may be used to program an RFID tag associated with a workpiece. In some embodiments, information about the order from a QR code is transferred to an RFID tag attached to a workpiece just prior to the dipping process. Alternatively, information about an order may be read from an RFID tag and used to create a QR code for printing on a corresponding hydrofilm graphic for the order.

In some embodiments, an inkjet printer may be used to print a QR code identifying an order at the same time that the graphic is printed on the hydrofilm. Typically, the QR code is printed on a margin of the film, so that it does not interfere with the graphic to be transferred to a workpiece.

In yet other embodiments, films may be chosen with a specific color backing so that the final hydrodipped workpiece will have a desired look in terms of, for example, color combination, contrast, readability of text, or intended interference pattern. Additionally, in some cases, using a film with a specific backing color may obviate the need for applying primer to a workpiece (e.g., film with a white backing). In some cases the QR code may be printed within the graphic area, but still in a margin of the graphic.

In another embodiment, a workpiece may be subjected to sequential dippings, in which a different graphic is applied each time. In such a scenario, each hydrofilm graphic may have its own QR code associating the graphic with, e.g., the order number. Alternatively, the two hydrofilm graphics could have the same QR code corresponding to the same order number, but including instructions for sequential dipping for an operator to follow.

In certain embodiments, a QR code or RFID tag may also be associated with a masking fixture, so that a masking fixture made to fit a certain workpiece or SKU and associated with an order can be paired with the appropriate SKU for fitting and dipping.

In terms of information retrieval via a QR code or RFID tag, a reader or scanner may query a SQL database for order number or other information about an order such as graphic identification, workpiece identification, customer information, laser etch message information, gift message text, or other information about the order.

A number of RFID technologies are suitable for the systems and methods described herein, including passive reader active tag (PRAT) systems, active reader passive tag (ARPT systems), and active reader active tag (ARAT) systems. A number of radio frequencies are suitable for use in fluid transfer printing, including low frequency, high frequency, and ultra-high frequency. In many situations UHF tags will be suitable, however in some embodiments, a low frequency RF tag may be used, e.g., for circumstances involving metal housings, unusual temperature ranges, or exposure to fluids.

Another information field that may be associated with identifier codes such as QR codes and RFID tags is timestamps. Throughout the item retrieval, fluid transfer printing, packaging, and shipping processes, timestamps will frequently be recorded, associated with the order number, and stored in a dedicated field linked to the order in a database. Additionally, the location that each step in the process occurs may also be recorded, associated with the order number, and stored in a dedicated field linked to the order in a database. In certain embodiments, an order number may be linked to multiple SKUs, for example where a customer has ordered multiple custom printed products. In this situation, each item in the multiple SKU order may have a suffix appended to the order number to identify the components of the order through the process.

Additionally, in certain embodiments, images having like properties may be aggregated for printing in the same batch, for example, light images together, dark images together, or colorful images together. In some embodiments, an artificial intelligence system may be trained on sets of data that fall within these categories to help with selection and aggregation. For example, a machine vision system may be trained to identify images or image portions that contain a specified range of red-green-blue (RGB) or cyan-magenta-yellow-key (black) (CMYK) values. Tags that signal this kind of organization or aggregation of images for batch printing and dipping may also be implemented via the QR codes, bar codes, or RFID tags described above.

Visual Examples of Products Printed According to the Present Methods

Figure 23:
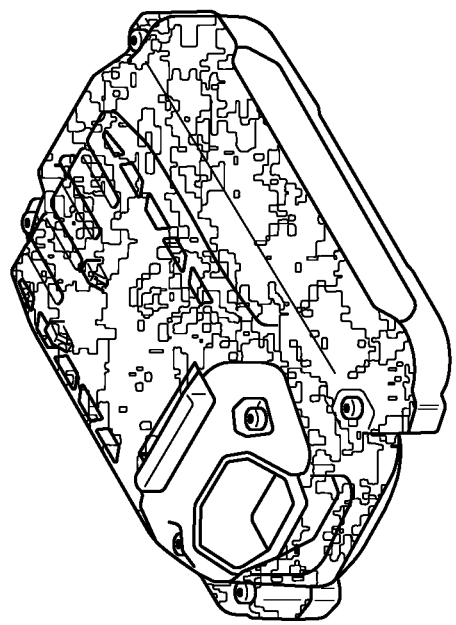
FIG. 23 is a representation of a power tool battery that has been fluid transfer printed with a camouflage design.

FIG. 23 is a representation of a power tool battery that has been fluid transfer printed with a camouflage design.

Figure 24:
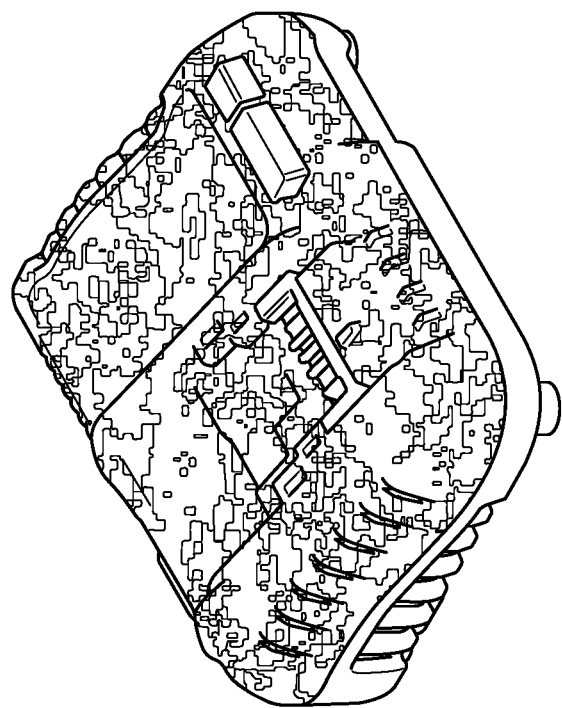
FIG. 24 is a representation of a battery charger that has been fluid transfer printed with a camouflage design.

FIG. 24 is a representation of a battery charger that has been fluid transfer printed with a camouflage design.

Figure 25:
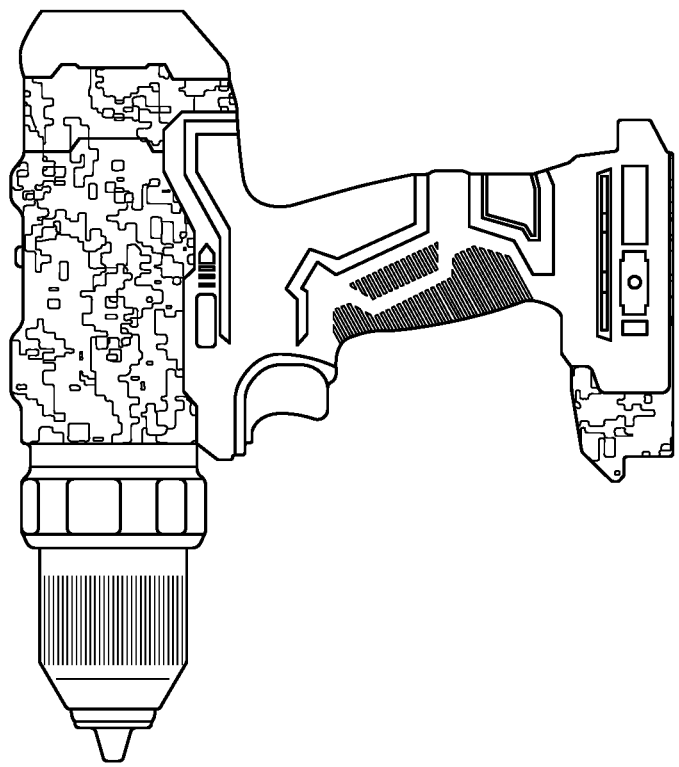
FIG. 25 is a representation of a cordless drill that has been fluid transfer printed with a camouflage design.

FIG. 25 is a representation of a cordless drill that has been fluid transfer printed with a camouflage design.

Figure 26:
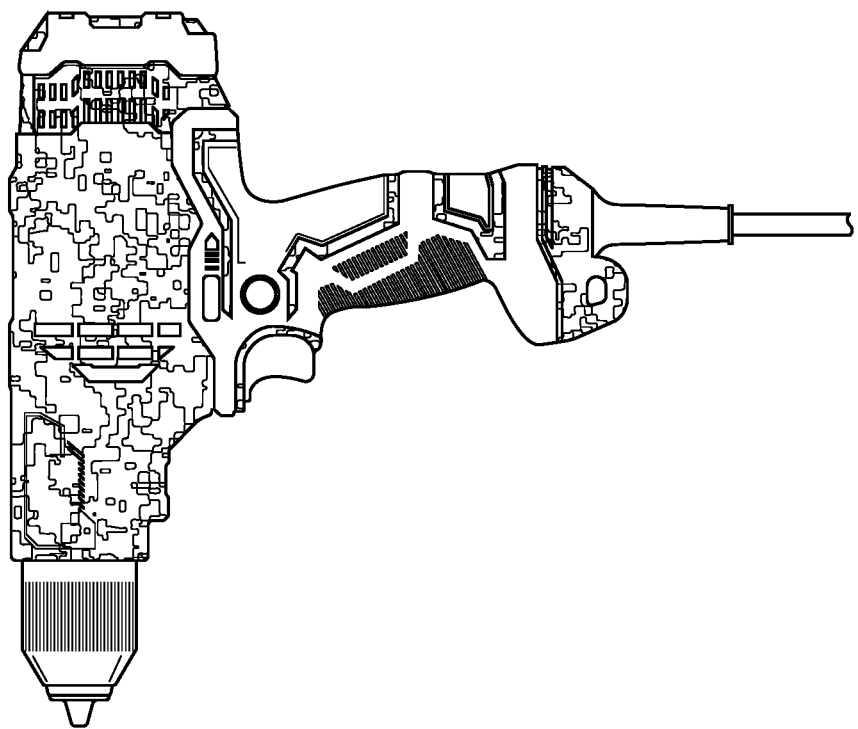
FIG. 26 is a representation of a corded drill that has been fluid transfer printed with a camouflage design.

FIG. 26 is a representation of a corded drill that has been fluid transfer printed with a camouflage design.

Figure 27:
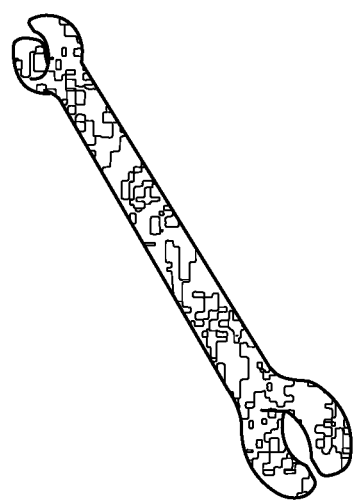
FIG. 27 is a representation of a standard wrench that has been fluid transfer printed with a camouflage design.

FIG. 27 is a representation of a standard wrench that has been fluid transfer printed with a camouflage design.

Figure 28:
FIG. 28 is a representation of a ratcheting wrench that has been fluid transfer printed with a camouflage design.

FIG. 28 is a representation of a ratcheting wrench that has been fluid transfer printed with a camouflage design.

Figure 29:
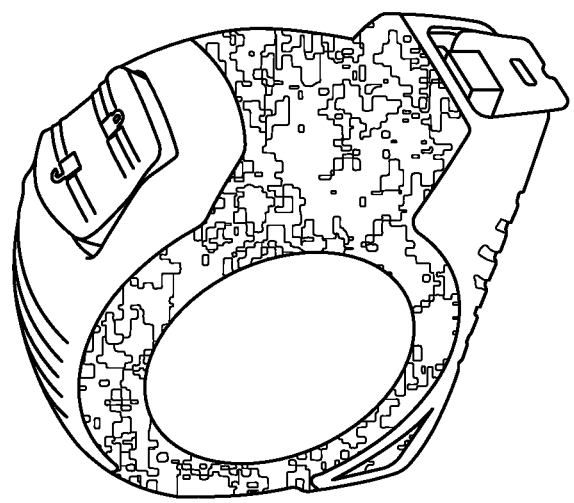
FIG. 29 is a representation of a tape measure that has been fluid transfer printed with a camouflage design.
Figure 32:
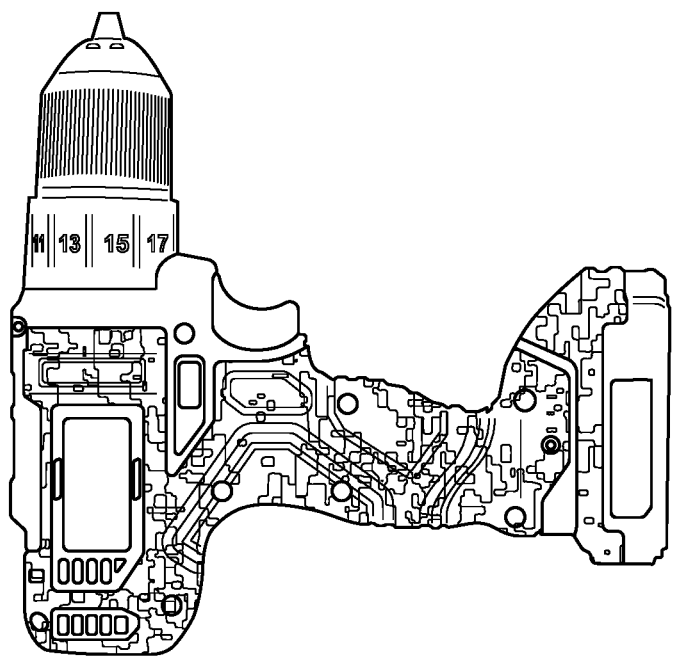
FIG. 32 is a representation of a Hercules® power drill that has been fluid transfer printed with a camouflage design.
Figure 31:
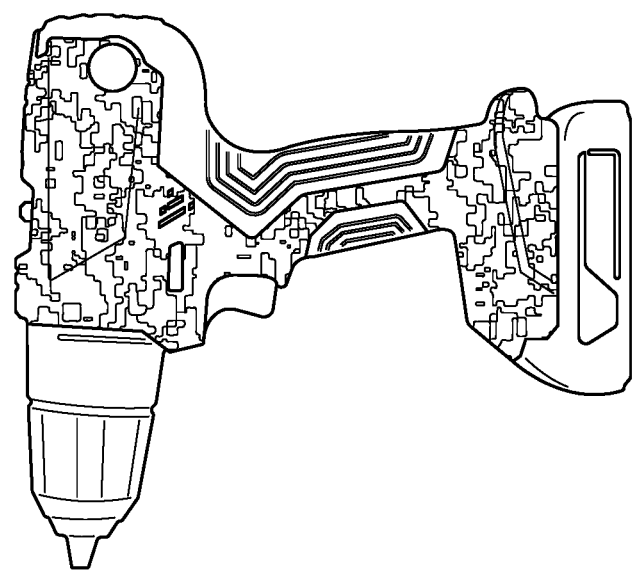
FIG. 31 is a representation of a Bosch® power drill that has been fluid transfer printed with a camouflage design.
Figure 33:
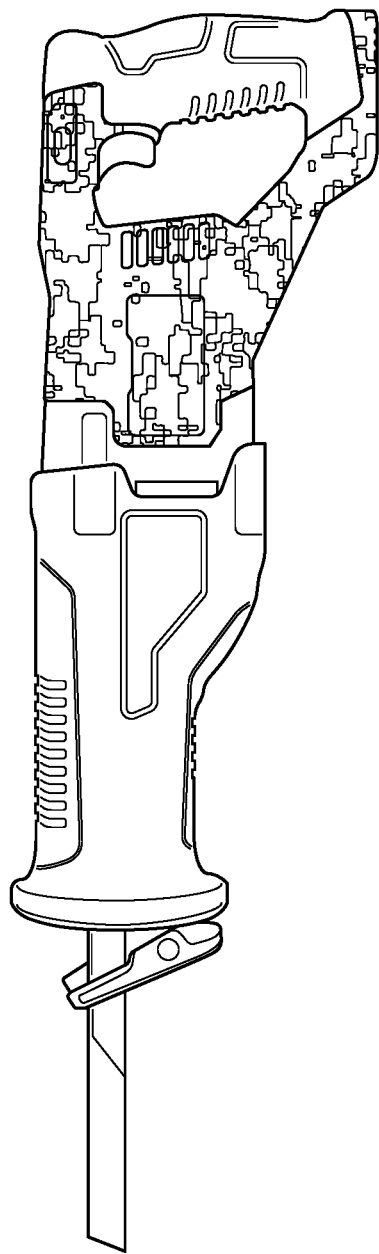
FIG. 33 is a representation of a Hercules® reciprocating saw that has been fluid transfer printed with a camouflage design.
Figure 35:
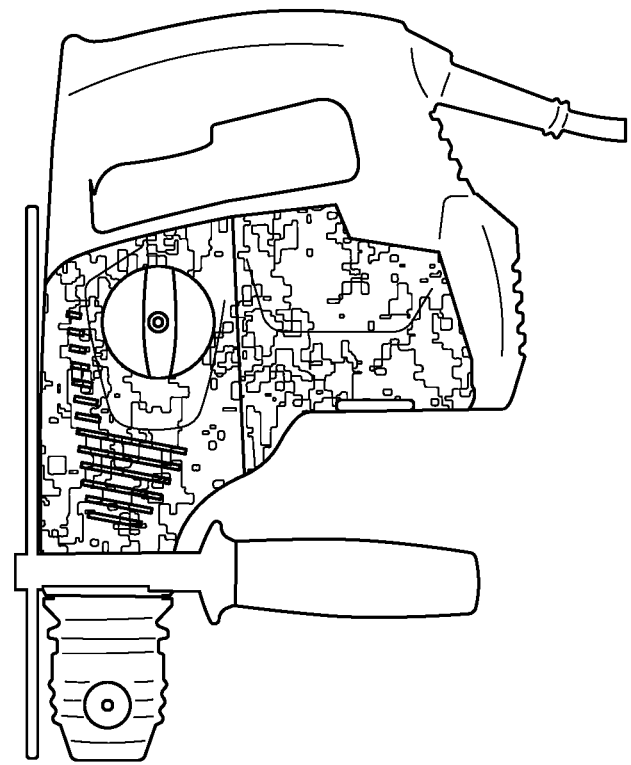
FIG. 35 is a representation of a Hilti® rotary hammer that has been fluid transfer printed with a camouflage design.
Figure 34:
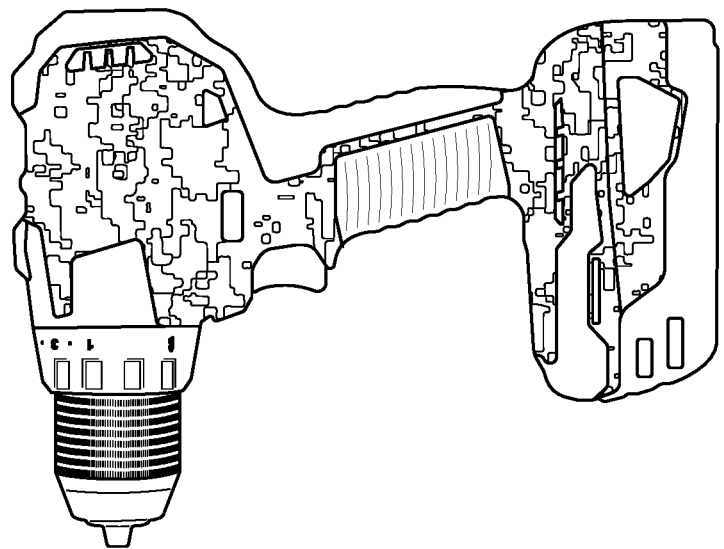
FIG. 34 is a representation of a Hilti® drill driver that has been fluid transfer printed with a camouflage design.
Figure 37:
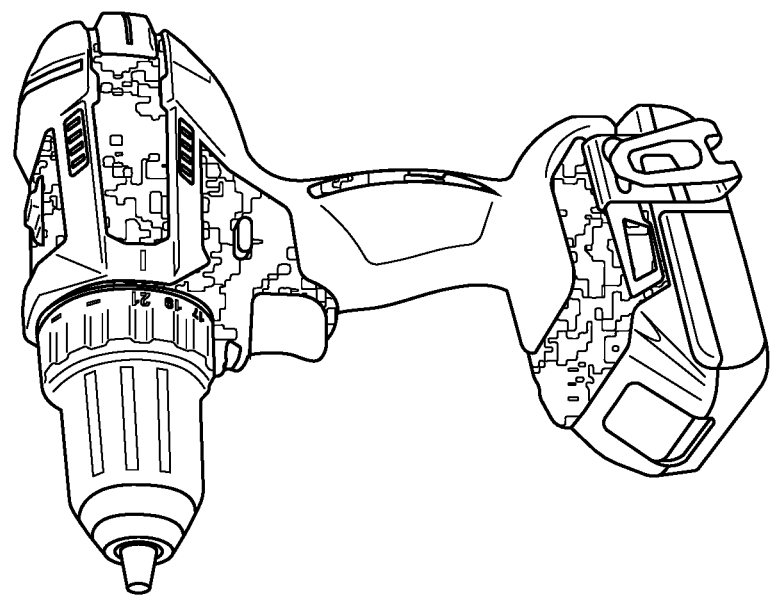
FIG. 37 is a representation of a Makita® power drill that has been fluid transfer printed with a camouflage design.
Figure 36:
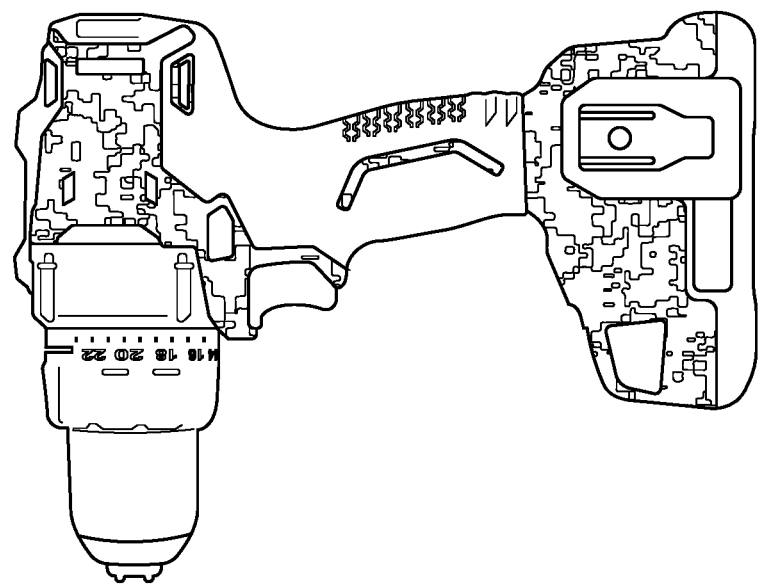
FIG. 36 is a representation of a Kobalt® power drill that has been fluid transfer printed with a camouflage design.
Figure 39:
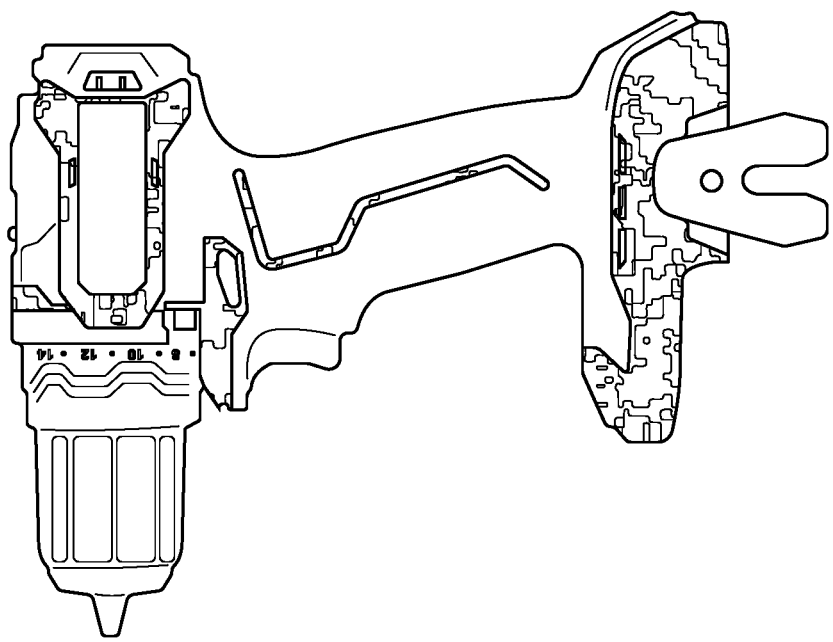
FIG. 39 is a representation of a Ridgid® power drill that has been fluid transfer printed with a camouflage design.
Figure 38:
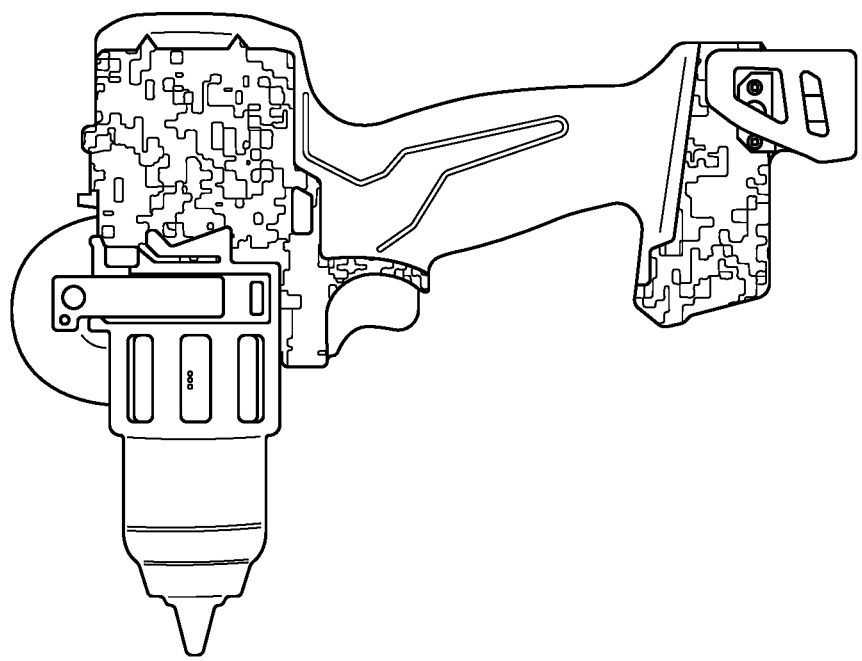
FIG. 38 is a representation of a Milwaukee® power drill that has been fluid transfer printed with a camouflage design.
Figure 41:
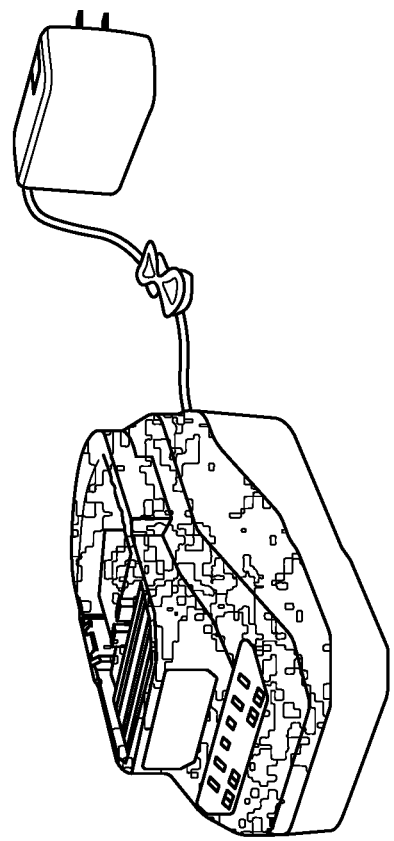
FIG. 41 is a representation of a Ryobi® battery that has been fluid transfer printed with a camouflage design.
Figure 40:
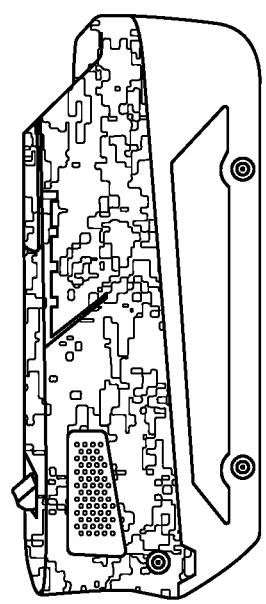
FIG. 40 is a representation of a Ridgid® battery that has been fluid transfer printed with a camouflage design.
Figure 43:
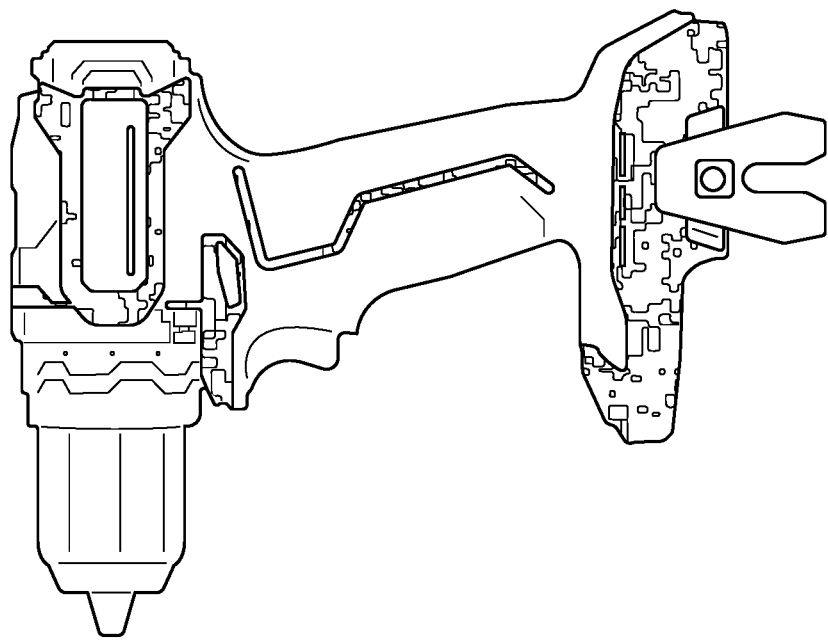
FIG. 43 is a representation of a Ryobi® drill that has been fluid transfer printed with a camouflage design.
Figure 42:
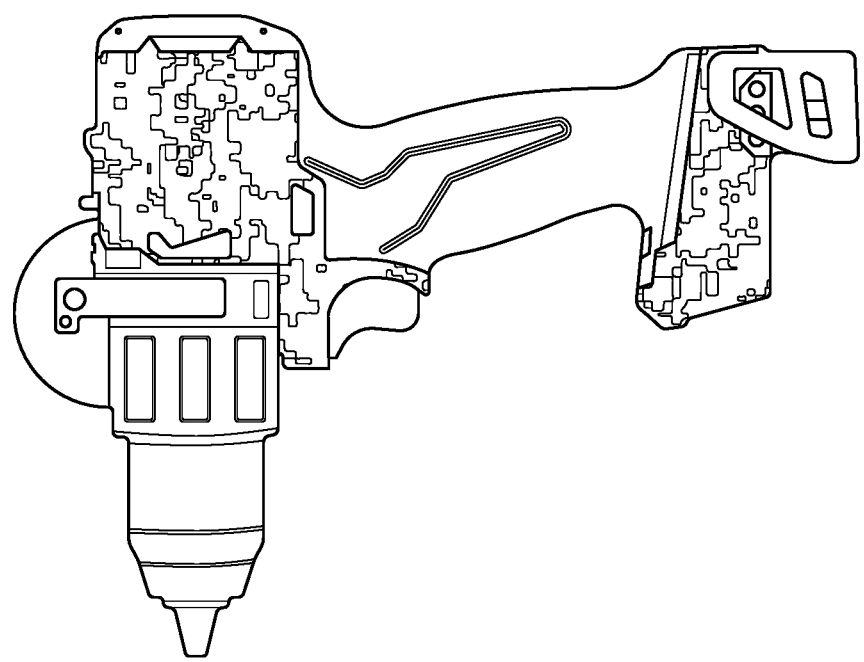
FIG. 42 is a representation of a Ridgid® impact driver that has been fluid transfer printed with a camouflage design.
Figure 44:
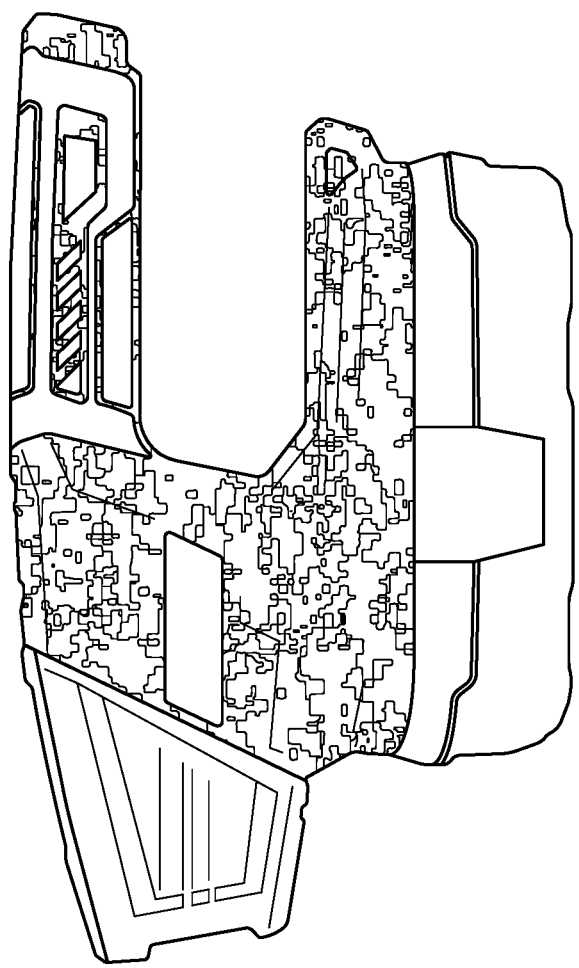
FIG. 44 is a representation of a Ryobi® flashlight that has been fluid transfer printed with a camouflage design.

FIG. 29 is a representation of a tape measure that has been fluid transfer printed with a camouflage design.

Figure 30:
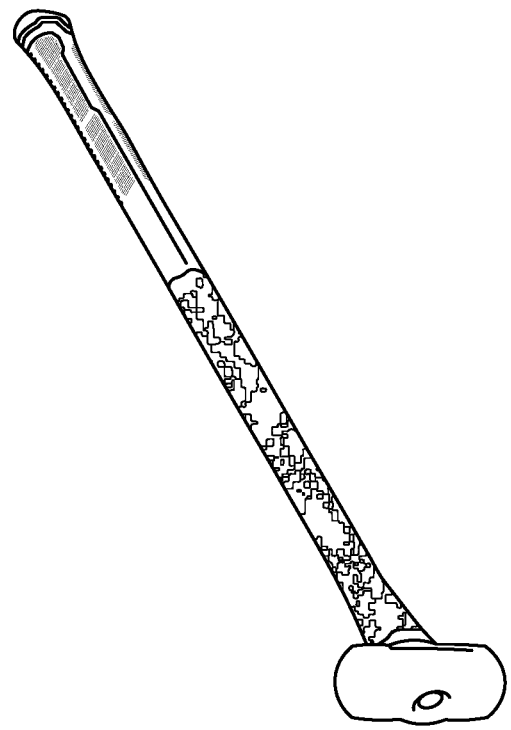
FIG. 30 is a representation of a sledgehammer that has been fluid transfer printed with a camouflage design.

FIG. 30 is a representation of a sledgehammer that has been fluid transfer printed with a camouflage design.

FIGS. 31-44 show representations of various items from the market as they would look if they were printed with a camouflage design according to the methods and systems of the present inventions.

Clauses

1. A method of custom-printing an item comprising:
   accepting customer request data for at least one workpiece and customer request data for at least one graphic design to cover at least a portion of the workpiece;
   accepting workpiece identifier data from a workpiece database based on the customer request data for at least one workpiece;
   accepting print design data from a print design database based on the customer request data for at least one graphic design;
   associating the print design data with the workpiece identifier data;
   printing the print design data onto a hydrofilm portion;
   placing the hydrofilm portion onto a fluid surface in a dip tank;
   applying an activator to the hydrofilm portion to yield an activated hydrofilm portion; and
   dipping the workpiece into the dip tank, whereby the activated hydrofilm portion is bonded to the workpiece as a result of the dipping.

2. The method of clause 1 wherein the custom-printed workpiece comprises at least one of a custom-printed power tool, a custom-printed battery, or a custom-printed power tool accessory.

3. The method of clause 2 wherein the accepting customer request data for a workpiece and customer request data for a graphic design to cover at least a portion of the workpiece comprises:
   accepting customer selection data specifying at least one workpiece from an online store; and accepting at least one digital image file provided by a customer for printing on a selected workpiece.
4. The method of clause 3 wherein the accepting customer selection data specifying at least one workpiece from an online store comprises accepting a selection of a product from a webstore.
5. The method of clause 4 wherein the webstore comprises an online store including one or more of an online database or a shopping cart system.
6. The method of clause 4 wherein the product comprises at least one of a hand tool, a power tool, a power tool accessory, a power tool part, a vehicle part, a non-power tool, a garden tool, an item of apparel, a tape measure, or a toolbox.
7. The method of clause 6 wherein the power tool comprises at least one of a power drill, a power driver, a reciprocating saw, a flashlight, a miter saw, or a nail gun.
8. The method of clause 6 wherein the non-power tool comprises at least one of a wrench, a hammer, a pliers, a screwdriver, a multi-tool, or a level.
9. The method of clause 4 wherein the webstore comprises at least one selection of workpieces and at least one selection of graphic designs.
10. The method of clause 1 wherein the customer request data for at least one graphic design comprises:
customer request data for at least one user-uploaded graphic design to be used to cover at least a portion of the at least one workpiece.
11. The method of clause 10 wherein the user-uploaded graphic design comprises at least one of a user-uploaded photo, user-uploaded artwork, or user-uploaded text.
12. The method of clause 1 wherein the graphic design comprises at least one non-fungible token (NFT).
13. The method of clause 1, further comprising registering the graphic design on a blockchain as a non-fungible token.
14. The method of clause 1 further comprising evaluating the graphic design for a conflict with one or more third-party intellectual property rights.
15. The method of clause 14 wherein the evaluating a graphic design for a conflict with one or more third-party intellectual property rights comprises:
evaluating at least one of an image or text for visual similarity to a trademarked image or phrase.
16. The method of clause 15 wherein the evaluating at least one of an image or text for visual similarity to a trademarked image or phrase comprises:
employing a machine vision program to evaluate an image or text for visual similarity to a trademarked image or phrase.
17. The method of clause 14 wherein the one or more third-party intellectual property rights comprises at least one licensing requirement.
18. The method of clause 14 wherein the one or more third-party intellectual property rights comprises at least one of trademark, service mark, trade dress, trade name, design patent, or copyright.
19. The method of clause 18 wherein the trademark comprises at least one of a wordmark, a brandmark, a lettermark, a logo, an icon, or a slogan.
20. The method of clause 1 wherein the accepting workpiece identifier data from a workpiece database based on the customer request comprises:
accepting at least one of a stock-keeping unit (SKU) identifier, a model number, or a serial number as the workpiece identifier data.
21. The method of clause 1 wherein the associating the print design data with the workpiece identifier data comprises:
associating the print design data with workpiece identifier metadata in a print design data file.
22. The method of clause 1 wherein the accepting print design data from a print design database based on the request for a graphic design further comprises:
evaluating the print design data for at least one of a minimum resolution, a minimum quality threshold, accuracy, look and feel, or legibility.
23. A method for manipulating a visual element for fluid transfer printing comprising:
receiving a digital image file;
manipulating at least one aspect of at least a portion of a visual element present within the digital image file; and
printing at least a portion of a manipulated visual element onto one or more hydrofilm sheets based at least in part on the manipulating.
24. The method of clause 23, further comprising coordinating placement of the manipulated visual element on the one or more hydrofilm sheets with a zone on the one or more hydrofilm sheets, whereby the manipulated visual element adheres to a workpiece lowered onto the zone during a fluid transfer printing process.
25. The method of clause 23 wherein the digital image file includes one or more of a personal photograph, a design element, or a text image.
26. The method of clause 23 wherein the at least one aspect comprises at least one of pattern, scale, angle, positioning, or color.
27. The method of clause 26 wherein the at least one pattern comprises at least one of grasshopper strips, fractals, nano pattern, or camouflage.
28. The method of clause 23 wherein the manipulating is accomplished using at least one of a digital pattern generator, an accelerating curve function, or a generative algorithm.
29. The method of clause 23 wherein the manipulating comprises at least one of randomization, non-linear tessellation, periodic tessellation, or non-periodic tessellation.
30. The method of clause 23, wherein the manipulating at least one aspect of at least a portion of a visual element present within the digital image file comprises: applying one or more matrix transformations to the at least a portion of a visual element present within the digital image file.
31. The method of clause 30, wherein the one or more matrix transformations is used to rotate, translate, or scale points of the visual element in two-dimensional or three-dimensional space.
32. A method comprising:
accepting print design data corresponding to a plurality of graphic designs;
mapping the print design data to a sheet of hydrofilm, wherein the plurality of graphic designs is arranged to facilitate hydrodipping of a plurality of workpieces corresponding to the plurality of graphic designs;
printing the print design data onto a hydrofilm portion; and
hydrodipping the plurality of workpieces onto the hydrofilm portion, whereby the hydrofilm portion is bonded to the plurality of workpieces, thereby transferring the plurality of graphic designs onto the plurality of workpieces.

33. The method of clause 32, wherein the accepting print design data corresponding to a plurality of graphic designs further comprises:
accepting one or more sets of print design data that correspond to contours of the workpiece at least partly based on at least one of a light intensity matrix or a color intensity matrix.

34. The method of clause 32, wherein the mapping the print design data to a sheet of hydrofilm comprises:
applying a scale factor to the print design data to obtain scaled print design data, and mapping the scaled print design data to a sheet of hydrofilm, wherein the plurality of graphic designs is arranged to facilitate hydrodipping of a plurality of workpieces corresponding to the plurality of graphic designs.

35. The method of clause 32, wherein the mapping the print design data to a sheet of hydrofilm comprises:
assigning a set of position coordinates to the print design data and assigning a set of counterpart position coordinates to a sheet of hydrofilm, wherein the plurality of graphic designs is arranged to facilitate hydrodipping of a plurality of workpieces corresponding to the plurality of graphic designs.

36. The method of clause 1 wherein the printing the print design data onto a hydrofilm portion comprises:
using an inkjet printer to print the print design data onto a hydrofilm portion.

37. The method of clause 36 wherein the using an inkjet printer to print the print design data onto a hydrofilm portion comprises:
using a Mimaki® printer or a similar printer to print the print design data onto a hydrofilm portion.

38. The method of clause 36 wherein the inkjet printer is configured to print multiple graphic designs onto a single sheet of hydrofilm.

39. The method of clause 1 wherein the printing the print design data onto a hydrofilm portion comprises:
printing multiple sets of print design data onto a hydrofilm portion, wherein each set of print design data is printed on a discrete zone of the hydrofilm portion.

40. The method of clause 1, wherein the placing the hydrofilm portion onto a fluid surface in a dip tank comprises:
placing the hydrofilm portion onto a non-aqueous fluid surface in a dip tank.

41. The method of clause 40 wherein the non-aqueous fluid comprises Novec™.

42. The method of clause 1 wherein the dipping the workpiece into the dip tank comprises:
dipping the workpiece into the dip tank using a multi-functional masking fixture.

43. A multi-functional masking fixture comprising:
a masking piece, wherein the masking piece is operable to cover a designated portion of a workpiece;
the masking piece further comprising a holding portion operable to facilitate movement of the workpiece into and out of a dip tank during fluid transfer printing.

44. The multi-functional masking fixture of clause 43, wherein the masking piece is contoured to at least a portion of the workpiece and includes at least one contour groove.

45. The multi-functional masking fixture of clause 43, wherein the masking piece is contoured to cover a grip portion and/or bumper of a power tool.

46. The multi-functional masking fixture of clause 43, wherein the masking piece is contoured to cover a grip portion and/or bumper of a power tool accessory.

47. The multi-functional masking fixture of clause 43, wherein the masking piece is contoured to at least one of a portion of a battery housing or a portion of a battery charger housing.

48. The method of clause 1 wherein the dipping the workpiece into the dip tank comprises:
dipping the workpiece into the dip tank using a compound bracket for holding a plurality of workpieces.

49. A compound support bracket comprising:
a support structure having a plurality of attachment points, wherein each attachment point is operable to suspend a workpiece during a dipping step of a fluid transfer printing process; and
wherein each attachment point is independently adjustable to a range of angles relative to at least one of a vertical axis, a horizontal axis, or another reference axis.

50. The compound support bracket of clause 49, wherein the compound support bracket is responsive to a quick response (QR) code or RFID associated with a specific workpiece that includes information about a desired angle with which to suspend the specific workpiece during a dipping process.

51. The compound support bracket of clause 49, further comprising one or more actuators operable to adjust one or more of the attachment points to a desired angle in response to an electronic signal.

52. The compound support bracket of clause 51, wherein the one or more actuators are configured to receive an electronic signal from a QR or RFID code reader.

53. The compound support bracket of clause 52, wherein the one or more actuators are operable to independently adjust the one or more attachment points in response to a plurality of QR code reader signals specifying a respective plurality of desired attachment point angles, each desired attachment point angle corresponding to a respective specific workpiece having a corresponding QR code that includes information about an attachment point angle for hydrodipping.

54. The method of clause 1 wherein the dipping the workpiece into the dip tank comprises:
coordinating workpiece/hydrofilm portion pairs, wherein multiple workpiece/hydrofilm portion pairs are dipped substantially simultaneously.

55. The method of clause 1 further comprising associating one or more identifier codes with one or more of the workpiece, a multi-functional masking fixture, or the hydrofilm portion.

56. The method of clause 55 wherein the one or more identifier codes comprises at least one of a QR code, a bar code, an alphanumeric code, or an RFID tag.

57. The method of clause 56, wherein the QR code comprises a QR code that is linked to one or more of product description information, inventory SKU information, print design data information, customer billing information, and customer shipping information.

58. The method of clause 1 wherein the accepting a customer request for a workpiece and a request for a graphic design to cover at least a portion of the workpiece further comprises:
determining the availability of at least one of the workpiece, the graphic design, or a pre-printed hydrofilm.

59. The method of clause 58 wherein the determining the availability of at least one of the workpiece, the graphic design, or a pre-printed hydrofilm comprises:
obtaining an indication of the availability of at least one of a desired image, text, or color of the graphic design;

obtaining an authorization to use the graphic design;
acquiring a digital file enabling reproduction of the graphic design; and
associating the digital file with a customer data file for the customer;
wherein the digital file is further associated with a workpiece and is trackable through printing, hydrodipping, curing, assembly, and shipping.

60. The method of clause 54, wherein the coordinating workpiece/hydrofilm portion pairs comprises:
associating a unique identifier for each print design with a corresponding counterpart identifier for each workpiece to create a plurality of print design/workpiece pairs.

61. The method of clause 60 wherein the associating a unique identifier for each print design with a corresponding counterpart unique identifier for each workpiece comprises:
aligning a unique identifier for each print design with a corresponding counterpart unique identifier for each workpiece.

62. The method of clause 54, wherein the coordinating workpiece/hydrofilm portion pairs comprises:
assigning a plurality of zones to the hydrofilm, wherein each zone corresponds to one graphic design/workpiece pair.

63. A method of tracking an order for a custom-printed item prior to shipping, the method comprising:
placing an identifier code on a portion of an ordered item, wherein the identifier code includes at least one of order information, customer billing information, customer shipping information, print design information, printer setting information, or hydrodipping setting information;
placing a corresponding identifier code on at least one hydrofilm portion, wherein the corresponding identifier code includes at least information about the ordered item;
performing fluid transfer printing of the at least one hydrofilm portion onto the ordered item; and
scanning the identifier code and the corresponding identifier code to confirm a match prior to shipping.

64. The method of clause 63 wherein at least one of the identifier code or the corresponding identifier code comprises a QR code or RFID tag.

65. The method of clause 1, wherein the applying an activator to the hydrofilm portion to yield an activated hydrofilm portion comprises:
applying a variable amount of activator depending on the specific needs of a particular hydrofilm portion.

66. The method of clause 65, wherein the applying a variable amount of activator depending on the specific needs of a particular hydrofilm portion comprises:
applying a quantity of activator that is specific to the amount of pigment on the hydrofilm portion.

67. The method of clause 1, wherein the applying an activator to the hydrofilm portion to yield an activated hydrofilm portion comprises:
applying an activator for a period of time that is optimal for a particular hydrofilm portion.

68. The method of clause 66 or clause 67, wherein an activator quantity or duration of exposure to the hydrofilm portion is determined by an analysis of pigment quantity on the hydrofilm portion.

69. The method of clause 68 wherein the analysis of pigment quantity is performed by a machine vision program.

70. The method of clause 1, wherein the activator comprises at least one of ultraviolet light activator, aerosol activator, or liquid activator.

71. The method of clause 1, wherein the activator comprises at least one of xylene, isobutanol, butyl, methyl acetate, methyl ethyl ketone, ethyl isobutyl ketone, isophorone, texanol, 2-butoxyethanol, or cyclohexanone.

72. The method of clause 65, wherein the hydrofilm portion comprises an ultraviolet light-dissolvable film.

73. An apparatus comprising:
a masking fixture reversibly affixed to a workpiece intended for fluid transfer printing, wherein the masking fixture is substantially contoured to at least a portion of the workpiece; and wherein the masking fixture is operable to prevent fluid transfer printing of at least a portion of the workpiece.

74. A system for custom-printing an item comprising:
an online store for accepting a) a customer request for a workpiece and b) a customer request for a graphic design to cover at least a portion of the workpiece;
a workpiece database for providing workpiece identifier data based on the customer request;
a print design database for providing print design data based on the request for a graphic design;
wherein the print design data is associated with the workpiece identifier data as an order;
a printer for printing the print design data onto a hydrofilm portion; and
an automated structural support system for dipping the workpiece into and out of a dip tank.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having ordinary skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant). Those having ordinary skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary.

In some implementations described herein, logic and similar implementations may include software or other control structures suitable to operation. Electronic circuitry, for example, may manifest one or more paths of electrical current constructed and arranged to implement various logic functions as described herein. In some implementations, one or more media are configured to bear a device-detectable implementation if such media hold or transmit a special-purpose device instruction set operable to perform as described herein. In some variants, for example, this may manifest as an update or other modification of existing software or firmware, or of gate arrays or other programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise controlling special-purpose components. Specifications or other implementations may be transmitted by one or more instances of tangible or transitory transmission media as described herein, optionally by packet transmission or otherwise by passing through distributed media at various times.

Alternatively or additionally, implementations may include executing a special-purpose instruction sequence or otherwise operating circuitry for enabling, triggering, coordinating, requesting, or otherwise causing one or more occurrences of any functional operations described above. In some variants, operational or other logical descriptions herein may be expressed directly as source code and compiled or otherwise expressed as an executable instruction sequence. In some contexts, for example, C++ or other code sequences can be compiled directly or otherwise implemented in high-level descriptor languages (e.g., a logic-synthesizable language, a hardware description language, a hardware design simulation, and/or other such similar modes of expression). Alternatively or additionally, some or all of the logical expression may be manifested as a Verilog-type hardware description or other circuitry model before physical implementation in hardware, especially for basic operations or timing-critical applications. Those skilled in the art will recognize how to obtain, configure, and optimize suitable transmission or computational elements, material supplies, actuators, or other common structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those having ordinary skill in the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a USB drive, a solid state memory device, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read-only, etc.)), and/or electrical circuitry forming a communications device (e.g., a modem, communications switch, optical-electrical equipment, etc.). Those having ordinary skill in the art will recognize that the subject matter described herein may be implemented in an analog or digital fashion or some combination thereof.

Those skilled in the art will recognize that at least a portion of the devices and/or processes described herein can be integrated into a data processing system. Those having ordinary skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

In certain cases, use of a system or method as disclosed and claimed herein may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific examples set forth and the accompanying discussion are intended to be representative of their more general classes. In general, use of any specific example is intended to be representative of its class, and the non-inclusion of specific components (e.g., operations), devices, and objects should not be taken to be limiting.

With respect to the use of substantially any plural and/or singular terms herein, those having ordinary skill in the art can translate from the plural to the singular or from the singular to the plural as is appropriate to the context or application. The various singular/plural permutations are not expressly set forth herein for sake of clarity.

The herein described subject matter sometimes illustrates different components contained within, or connected with, different other components. It is to be understood that such depicted architectures are presented merely as examples, and that in fact many other architectures may be implemented which achieve the same functionality. In a conceptual sense, any arrangement of components to achieve the same functionality is effectively "associated" such that the desired functionality is achieved. Therefore, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of "operably couplable" include but are not limited to physically mateable or physically interacting components, wirelessly interactable components, wirelessly interacting components, logically interacting components, or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components, inactive-state components, or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such a recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having ordinary skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having ordinary skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented as sequences of operations, it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of custom-printing an item comprising:
accepting customer request data for a workpiece and customer request data for a graphic design to cover at least a portion of the workpiece;
accepting workpiece identifier data from a workpiece database based on the customer request data for a workpiece;
accepting print design data from a print design database based on the customer request data for a graphic design;
associating the print design data with the workpiece identifier data;
associating a unique identifier for each graphic design with a corresponding counterpart identifier for each workpiece to create a plurality of graphic design/workpiece pairs, wherein the unique identifier associating step comprises writing a unique identifier from the graphic design to one or more RFID tags associated with the corresponding workpiece for each graphic design/workpiece pair;
printing the print design data onto a hydrofilm portion;
placing the hydrofilm portion onto a fluid surface in a dip tank;
applying an activator to the hydrofilm portion to yield an activated hydrofilm portion; and
dipping the workpiece into the dip tank, whereby the activated hydrofilm portion is bonded to the workpiece as a result of the dipping.

2. The method of claim 1 wherein the workpiece is at least one of a custom-printed power tool, a custom-printed battery, or a custom-printed power tool accessory.

3. The method of claim 1 wherein the accepting customer request data for a workpiece and customer request data for a graphic design to cover at least a portion of the workpiece comprises:
accepting customer selection data specifying at least one workpiece from an online store; and
accepting at least one digital image file provided by a customer for printing on a selected workpiece.

4. The method of claim 3 wherein the accepting customer selection data specifying at least one workpiece from an online store comprises accepting a selection of a product from a web store.

5. The method of claim 4 wherein the webstore comprises an online store including one or more of an online database or a shopping cart system.

6. The method of claim 4 wherein the product comprises at least one of a hand tool, a power tool, a power tool accessory, a power tool part, a vehicle part, a non-power tool, a garden tool, an item of apparel, a tape measure, or a toolbox.

7. The method of claim 6 wherein the power tool comprises at least one of a power drill, a power driver, a reciprocating saw, a flashlight, a miter saw, or a nail gun.

8. The method of claim 6 wherein the non-power tool comprises at least one of a wrench, a hammer, a pliers, a screwdriver, a multi-tool, or a level.

9. The method of claim 4 wherein the webstore comprises at least one selection of workpieces and at least one selection of graphic designs.

10. The method of claim 1 wherein the customer request data for at least one graphic design comprises:
customer request data for at least one user-uploaded graphic design to be used to cover at least a portion of the at least one workpiece.

11. The method of claim 10 wherein the user-uploaded graphic design comprises at least one of a user-uploaded photo, user-uploaded artwork, or user-uploaded text.

12. The method of claim 1 wherein the graphic design comprises at least one non-fungible token (NFT).

13. The method of claim 1, further comprising registering the graphic design on a blockchain as a non-fungible token.

14. The method of claim 1 further comprising evaluating the graphic design for a conflict with one or more third-party intellectual property rights.

15. The method of claim 14 wherein the evaluating a graphic design for a conflict with one or more third-party intellectual property rights comprises:
evaluating at least one of an image or text for visual similarity to a trademarked image or phrase.

16. The method of claim 15 wherein the evaluating at least one of an image or text for visual similarity to a trademarked image or phrase comprises:
employing a machine vision program to evaluate an image or text for visual similarity to a trademarked image or phrase.

17. The method of claim 14 wherein the one or more third-party intellectual property rights comprises at least one licensing requirement.

18. The method of claim 14 wherein the one or more third-party intellectual property rights comprises at least one of trademark, service mark, trade dress, trade name, design patent, or copyright.

19. The method of claim 18 wherein the trademark comprises at least one of a wordmark, a brandmark, a lettermark, a logo, an icon, or a slogan.

20. The method of claim 1 wherein the accepting workpiece identifier data from a workpiece database based on the customer request comprises:
accepting at least one of a stock-keeping unit (SKU) identifier, a model number, or a serial number as the workpiece identifier data.

21. The method of claim 1 wherein the accepting print design data from a print design database based on the request for a graphic design further comprises:
evaluating the print design data for at least one of a minimum resolution, a minimum quality threshold, accuracy, look and feel, or legibility.

22. The method of claim 1 further comprising associating one or more identifier codes with one or more of the workpiece, a multi-functional masking fixture, or the hydrofilm portion.

23. The method of claim 22 wherein the one or more identifier codes comprises at least one of a QR code, a bar code, an alphanumeric code, or an RFID tag.

24. The method of claim 23, wherein the QR code comprises a QR code that is linked to one or more of product description information, inventory SKU information, print design data information, customer billing information, and customer shipping information.

25. The method of claim 1 wherein the accepting a customer request for a workpiece and a request for a graphic design to cover at least a portion of the workpiece further comprises:
- determining the availability of at least one of the workpiece, the graphic design, or a pre-printed hydrofilm.

26. The method of claim 25 wherein the determining the availability of at least one of the workpiece, the graphic design, or a pre-printed hydrofilm comprises:
- obtaining an indication of the availability of at least one of a desired image, text, or color of the graphic design;
- obtaining an authorization to use the graphic design;
- acquiring a digital file enabling reproduction of the graphic design; and
- associating the digital file with a customer data file for the customer;
- wherein at least a portion of the digital file is further associated with a workpiece and is trackable through printing, hydrodipping, curing, assembly, and shipping.

\* \* \* \* \*